United States Patent
Silvernail et al.

(10) Patent No.: US 9,127,236 B2
(45) Date of Patent: *Sep. 8, 2015

(54) ALKALINE DETERGENT COMPOSITION CONTAINING A CARBOXYLIC ACID TERPOLYMER FOR HARD WATER SCALE CONTROL

(71) Applicants: ECOLAB USA INC., St. Paul, MN (US); BASF SE, Ludwigshafen (DE)

(72) Inventors: Carter M. Silvernail, Burnsville, MN (US); Erik C. Olson, Savage, MN (US); Kerrie Walters, Minneapolis, MN (US); Juergen Detering, Limburgerhof (DE); Arend Jouke Kingma, Weisenheim am Sand (DE); James S. Dailey, Grosse Ile, MI (US)

(73) Assignees: ECOLAB USA INC., St. Paul, MN (US); BASF SE, Ludwigshafen (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/049,951

(22) Filed: Oct. 9, 2013

(65) Prior Publication Data

US 2015/0099686 A1    Apr. 9, 2015

(51) Int. Cl.
| | | |
|---|---|---|
| C11D 17/00 | (2006.01) | |
| C11D 7/06 | (2006.01) | |
| C11D 3/37 | (2006.01) | |
| C11D 3/04 | (2006.01) | |

(52) U.S. Cl.
CPC ............... *C11D 3/044* (2013.01); *C11D 3/3707* (2013.01); *C11D 3/378* (2013.01); *C11D 3/3761* (2013.01); *C11D 3/3765* (2013.01); *C11D 7/06* (2013.01); *C11D 17/0008* (2013.01); *C11D 17/0052* (2013.01); *C11D 17/0073* (2013.01); *C11D 17/0086* (2013.01); *C11D 17/0091* (2013.01)

(58) Field of Classification Search
CPC .. C11D 3/3707; C11D 3/3761; C11D 3/3765; C11D 3/378; C11D 7/06; C11D 17/0052; C11D 17/0073; C11D 17/0086; C11D 17/0091; C11D 17/0008
USPC .......................... 510/476, 445, 446, 451, 435
See application file for complete search history.

(56) References Cited

U.S. PATENT DOCUMENTS

| | | | |
|---|---|---|---|
| 5,039,447 A | 8/1991 | Reuben | |
| 5,292,447 A | 3/1994 | Venturello et al. | |
| 5,294,362 A | 3/1994 | Venturello et al. | |
| 5,422,028 A | 6/1995 | Oakes et al. | |
| 6,462,006 B1 | 10/2002 | Sorg et al. | |
| 7,192,911 B2 | 3/2007 | Sunder et al. | |
| 8,093,196 B2 | 1/2012 | Seebeck et al. | |
| 2005/0113280 A1* | 5/2005 | Reddy et al. | 510/475 |
| 2005/0202994 A1 | 9/2005 | Baum et al. | |
| 2006/0015509 A1 | 1/2006 | Naitou | |
| 2007/0082831 A1 | 4/2007 | Guzmann et al. | |
| 2007/0129516 A1* | 6/2007 | Detering et al. | 526/260 |
| 2007/0149436 A1* | 6/2007 | Boeckh et al. | 510/475 |
| 2008/0188391 A1 | 8/2008 | Seebeck et al. | |
| 2010/0004154 A1* | 1/2010 | Detering et al. | 510/360 |
| 2010/0065090 A1 | 3/2010 | Tropsch | |
| 2010/0160203 A1 | 6/2010 | Seebeck et al. | |
| 2010/0227787 A1 | 9/2010 | Seebeck et al. | |
| 2010/0249010 A1 | 9/2010 | Seebeck et al. | |
| 2011/0245132 A1 | 10/2011 | Dupont et al. | |
| 2012/0010117 A1 | 1/2012 | Seebeck et al. | |
| 2012/0129749 A1 | 5/2012 | Detering et al. | |
| 2012/0129750 A1 | 5/2012 | Detering et al. | |
| 2012/0196784 A1 | 8/2012 | Seebeck et al. | |

FOREIGN PATENT DOCUMENTS

| | | |
|---|---|---|
| CA | 2817174 | 5/2012 |
| CN | 1239503 A | 12/1999 |
| DE | 19819187 A1 | 11/1999 |
| DE | 10225794 A1 | 12/2003 |
| EP | 0778340 A2 | 6/1997 |
| EP | 0798320 | 10/1997 |
| EP | 0851023 A2 | 7/1998 |
| WO | WO 98/16612 A1 | 4/1998 |
| WO | WO 98/16613 A1 | 4/1998 |
| WO | WO 2005/042684 A1 | 5/2005 |
| WO | WO 2008/132131 A1 | 11/2008 |
| WO | WO 2010/024468 A1 | 3/2010 |
| WO | 2010086821 | 8/2010 |

OTHER PUBLICATIONS

CN1239503, Procter & Gamble—English Translation, (Dec. 22, 1999).
DE 10225794, BASF—English Translation, (Dec. 18, 2003).
DE 19819187, Henkel Kommanditgesellschaft Auf Aktien—English Translation, (Nov. 11, 1999).
International Search Authority, "The International Search Report and The Written Opinion" issued in connection with International Application No. PCT/US2014/059859, 14 pages, mailed on Feb. 27, 2015.
Ecolab USA Inc., PCT/US2014/059878 filed Oct. 9, 2014, "The International Search Report and the Written Opinion of the International Searching Authority, or the Declaration", mailed Jan. 15, 2015.

* cited by examiner

*Primary Examiner* — Lorna M Douyon
(74) *Attorney, Agent, or Firm* — McKee, Voorhees & Sease, PLC

(57) ABSTRACT

A highly alkaline detergent is described which includes the use of a carboxylic acid terpolymer in combination with an alkali metal hydroxide. The detergent maintains cleaning functions and also prevents hard water scaling at application temperatures, for example at temperatures of between about 145-180 degrees Fahrenheit and, for example, at a pH of 9.5 to about 13.

12 Claims, No Drawings

ALKALINE DETERGENT COMPOSITION CONTAINING A CARBOXYLIC ACID TERPOLYMER FOR HARD WATER SCALE CONTROL

TECHNICAL FIELD

The present invention is related to the field of alkaline detergent compositions. In particular, the present invention is related to low-phosphorus alkaline detergent compositions including a carboxylic acid terpolymer for water scale control.

BACKGROUND OF THE INVENTION

The level of hardness in water can have a deleterious effect in many systems. For example, when hard water alone, or in conjunction with cleaning compositions, contacts a surface, it can cause precipitation of hard water scale on the contacted surface. Scaling is the precipitation of a salt from a solution that is supersaturated with respect to the salt. In general, hard water refers to water having a total level of calcium and magnesium ions in excess of about 100 ppm expressed in units of ppm calcium carbonate. Often, the molar ratio of calcium to magnesium in hard water is about 2:1 or about 3:1. Although most locations have hard water, water hardness tends to vary from one location to another.

Hard water is also known to reduce the efficacy of conventional alkaline detergents used in the vehicle care, warewashing, laundry, food and beverage and hard surface cleaning applications. One method for counteracting this includes adding chelating agents or sequestrants into detersive compositions that are intended to be mixed with hard water in an amount sufficient to handle the hardness. However, in many instances the water hardness exceeds the chelating capacity of the composition. As a result, free calcium ions may be available to cause precipitation, or to attack active components of the composition causing other deleterious effects, such as poor cleaning effectiveness or lime scale build up.

Alkaline detergents, particularly those intended for institutional and commercial use, generally contain phosphates, nitrilotriacetic acid (NTA) or ethylenediaminetetraacetic acid (EDTA) as a sequestering agent to sequester metal ions associated with hard water such as calcium, magnesium and iron and also to remove soils.

In particular, NTA, EDTA or polyphosphates such as sodium tripolyphosphate and their salts are used in detergents because of their ability to solubilize preexisting inorganic salts and/or soils. When calcium, magnesium salts precipitate, the crystals may attach to the surface being cleaned and cause undesirable effects. For example, calcium carbonate precipitation on the surface of ware can negatively impact the aesthetic appearance of the ware, giving an unclean look. The ability of NTA, EDTA and polyphosphates to remove metal ions facilitates the detergency of the solution by preventing hardness precipitation, assisting in soil removal and/or preventing soil redeposition during the wash process.

While effective, phosphates and NTA are subject to government regulations due to environmental and health concerns. Although EDTA is not currently regulated, it is believed that government regulations may be implemented due to environmental persistence. There is therefore a need in the art for an alternative, and preferably environment friendly, cleaning composition that can reduce the content of phosphorous-containing compounds such as phosphates, phosphonates, phosphites, and acrylic phosphinate polymers, as well as persistent aminocarboxylates such as NTA and EDTA.

Accordingly it is an object herein to provide an improved process for the prevention of scale in alkaline cleaning such as that used in ware washing, hard surface or CIP cleaning, car washing, instrument cleaning, boiler or cooling tower cleaning, laundry cleaning and the like.

It is another object to provide scale control compositions that may be used in conjunction with a cleaning composition for prevention of scale deposits not only on surfaces to be cleaned, but also on the cleaning machine components themselves.

Other objects, aspects and advantages of this invention will be apparent to one skilled in the art in view of the following disclosure, the drawings, and the appended claims.

SUMMARY OF THE INVENTION

One embodiment of the present invention provides a detergent composition including a carboxylic acid terpolymer, hereinafter also being referred to as terpolymer (A), and an alkali metal hydroxide. The detergent composition according to the invention may contain one or more additional polymers and/or a phosphonate. Examples of suitable additional polymers include polyacrylic acid, polymethacrylic acid, polymaleic acid homopolymers, copolymers of acrylic methacrylic or maleic acids (and combinations thereof). Other additional polymers which may be included are acrylic acid, methacrylic acid, and/or maleic acid copolymers or terpolymers. Such additional polymers may be hydrophobically modified. These and other polymers suitable for use according to the detergent compositions of the invention are set forth in the description of the invention.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION OF THE INVENTION

The detergent compositions of the present invention include an alkali metal hydroxide and a carboxylic acid terpolymer scale control agent. In addition, the detergent compositions according to the present invention are free of phosphate, and preferably they are also free of NTA to meet certain regulatory standards. The detergent compositions according to the present invention may be used for machine and manual warewashing, presoaks, laundry and textile cleaning and destaining, carpet cleaning and destaining, vehicle cleaning and care applications, surface cleaning and destaining, kitchen and bath cleaning and destaining, floor cleaning and destaining, cleaning in place operations, general purpose cleaning and destaining, and/or industrial or household cleaners. The composition may be in the form of a liquid concentrate, a use solution, a solid block, granules or a powder.

The embodiments of this invention are not limited to particular solid detergent compositions as they may vary. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "cleaning," as used herein, refers to performing or aiding in any soil removal, bleaching, microbial population reduction, or combination thereof.

As used herein, "terpolymer" refers to a polymer formed from three or more monomeric units.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Carboxylic Acid Terpolymers as Scale Control Agents

The detergent compositions according to the invention include an alkali metal hydroxide and at least one carboxylic acid terpolymer for controlling hard water scale. In the context of the present invention, carboxylic acid terpolymers are also referred to as terpolymers (A).

Terpolymers (A) are polymers which comprise, in copolymerized form, a1) 30 to 90% by weight of at least one monoethylenically unsaturated $C_3$-$C_8$-carboxylic acid, or an anhydride or salt thereof, a2) 3 to 60% by weight of at least one monomer comprising a sulfo group, a3) 3 to 60% by weight, and preferably up to 20% by weight of at least one nonionic monomer of the formula (I)

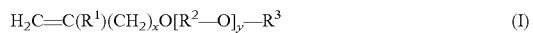

in which $R^1$ is hydrogen or methyl, $R^2$ are identical or different, linear or branched $C_2$-$C_6$-alkylene wherein $R^2$—O may be arranged in blocks or randomly, and $R^3$ is hydrogen or a straight-chain or branched $C_1$-$C_4$-alkyl, x is 0, 1 or 2 and y is a number from 3 to 50, a4) 0 to 30% by weight of one or more further ethylenically unsaturated monomers which are polymerizable with a1), a2) and a3), where the sum of a1), a2), a3) and a4) adds up to 100% by weight.

As component a1), terpolymer (A) comprises 30 to 90% by weight of at least one monoethylenically unsaturated $C_3$-$C_8$-carboxylic acid, or an anhydride or a salt thereof.

Suitable monoethylenically unsaturated $C_3$-$C_8$-carboxylic acids are especially acrylic acid, methacrylic acid, ethacrylic acid, vinylacetic acid, allylacetic acid, crotonic acid, maleic acid, fumaric acid, mesaconic acid and itaconic acid, and the water-soluble salts thereof. When monoethylenically unsaturated $C_3$-$C_8$-carboxylic acids mentioned can form anhydrides, the latter are also suitable as monomers a1), for example maleic anhydride and itaconic anhydride.

Preferred monoethylenically unsaturated $C_3$-$C_8$-carboxylic acids are acrylic acid and methacrylic acid, and the water-soluble salts thereof. Water-soluble salts are especially the sodium and potassium salts of the monoethylenically unsaturated $C_3$-$C_8$-carboxylic acids.

As component a2), terpolymer (A) comprises 3 to 60% by weight of at least one monomer comprising a sulfo group.

Examples of sulfo-group containing monomers are preferably those of the formulae (IIa) and (IIb)

in which X is an optionally present spacer group which may be selected from —$(CH_2)_n$— where n=0 to 4, —$C_6H_4$—, —$CH_2$—O—$C_6H_4$—, —C(O)—NH—$C(CH_3)_2$—, —C(O)—NH—$CH(CH_2CH_3)$—, —C(O)NH—$CH(CH_3)$$CH_2$—, —C(O)NH—$C(CH_3)_2CH_2$—, —C(O)NH—$CH_2CH(OH)CH_2$—, —C(O)NH—$CH_2$—, —C(O)NH—$CH_2CH_2$— and —C(O)NH—$CH_2CH_2CH_2$—.

Particularly preferred sulfo-containing monomers are 1-acrylamido-1-propanesulfonic acid (X=—C(O)NH—CH($CH_2CH_3$)— in formula IIa), 2-acrylamido-2-propanesulfonic acid (X=—C(O)NH—CH($CH_3$)$CH_2$— in formula IIa), 2-acrylamido-2-methylpropanesulfonic acid (AMPS, X=—C(O)NH—$C(CH_3)_2CH_2$— in formula IIa), 2-methacrylamido-2-methyl-propanesulfonic acid (X=—C(O)NH—$C(CH_3)_2CH_2$— in formula IIb), 3-methacrylamido-2-hydroxypropanesulfonic acid (X=—C(O)NH—$CH_2CH$(OH)$CH_2$— in formula IIb), allylsulfonic acid (X=$CH_2$ in formula IIa), methallylsulfonic acid (X=$CH_2$ in formula IIb), allyloxybenzenesulfonic acid (X=—$CH_2$—O—$C_6H_4$— in formula IIa), methallyloxybenzenesulfonic acid (X=—$CH_2$—O—$C_6H_4$— in formula IIb), 2-hydroxy-3-(2-propenyloxyl)propanesulfonic acid, 2-methyl-2-propene-1-sulfonic acid (X=$CH_2$ in formula IIb), styrenesulfonic acid (X=$C_6H_4$ in formula IIa), vinylsulfonic acid (X absent in formula IIa), 3-sulfopropyl acrylate (X=—C(O)O—$CH_2CH_2CH_2$— in formula IIa), 2-sulfoethyl methacrylate (X=—C(O)O—$CH_2CH_2$— in formula IIb), 3-sulfopropyl methacrylate (X=—C(O)O—$CH_2CH_2CH_2$— in formula IIb), sulfomethacrylamide (X=—C(O)NH— in formula IIb), sulfomethylmethacrylamide (X=—C(O)NH—$CH_2$— in formula IIb) and salts of the acids mentioned. Suitable salts are generally water-soluble salts, preferably the sodium, potassium and ammonium salts of the acids mentioned.

Especially preferred are 1-acrylamidopropanesulfonic acid, 2-acrylamido-2-propanesulfonic acid, 2-acrylamido-2- methylpropanesulfonic acid (AMPS), 2-methacrylamido-2-methylpropanesulfonic acid, 3-methacrylamido-2-hydroxypropanesulfonic acid, 2-hydroxy-3-(2-propenyloxy)propanesulfonic acid, 2-sulfoethyl methacrylate, styrenesulfonic acid, vinylsulfonic acid, allylsulfonic acid (ALS) and methallylsulfonic acid, and salts of the acids mentioned.

Very particularly preferred sulfo-containing monomers are 2-acrylamido-2-methylpropanesulfonic acid (AMPS) and allylsulfonic acid, and the water-soluble salts thereof, especially the sodium, potassium and ammonium salts thereof.

As monomer a3), terpolymer (A) comprises 3 to 60% by weight, preferably up to 20% by weight of at least one nonionic monomer of the formula (I)

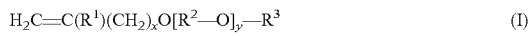

in which $R^1$ is hydrogen or methyl, $R^2$ is identical or different $C_2$-$C_6$-alkylene which may be linear or branched and wherein $R^2$—O arranged in blocks or randomly, and $R^3$ is hydrogen or a straight-chain or branched $C_1$-$C_4$-alkyl, x is 0, 1, 2 and y is from 3 to 50.

The $R^2$—O groups may be arranged in blocks and randomly, i.e. in one or more blocks of identical alkylene oxide and additionally randomly in one or more blocks of two or more different alkylene oxides. This is also included by the wording "arranged in blocks or randomly".

Preferred nonionic monomers a3) are those based on allyl alcohol ($R^1$=H; x=1) and isoprenol ($R^1$=methyl; x=2).

Nonionic monomer a3) comprises preferably an average of 8 to 40, more preferably 10 to 30, especially 10 to 25, alkylene oxide units. The index y in formula (I) is based on the mean number of alkylene oxide units.

Preferred alkylene oxide units $R^2$—O are ethylene oxide, 1,2-propylene oxide and 1,2-butylene oxide, particular preference being given to ethylene oxide and 1,2-propylene oxide.

In a specific embodiment, the nonionic monomers a3) comprise only ethylene oxide units. In a further specific embodiment, the nonionic monomers a3) comprise ethylene oxide and 1,2-propylene oxide units, which may be arranged in blocks or randomly.

$R^3$ is preferably hydrogen or methyl.

As monomer a4), terpolymer (A) may comprise 0 to 30% by weight of one or more further ethylenically unsaturated monomers polymerizable with a1), a2) and a3).

Useful further ethylenically unsaturated monomers a4) include, for example, acrylamide, t-butylacrylamide, vinyl acetate, vinyl methyl ether, hydroxybutyl vinyl ether, 1-vinylpyrrolidone, 1-vinylcaprolactam, 1-vinylimidazole, 2-vinylpyridine, 4-vinylpyridine, methyl methacrylate, ethyl acrylate, isobutene, diisobutene, isoprenol, 1-alkenes such as 1-octene, N,N-dimethylacrylamide and styrene.

The proportion of copolymerized monomers a1), especially of copolymerized acrylic acid, methacrylic acid or of a water-soluble salt of these acids, is preferably 40 to 90% by weight, more preferably 45 to 85% by weight and especially preferably 50 to 85% by weight. The proportion of copolymerized monomers a2), especially of copolymerized 2-acrylamido-2-methylpropanesulfonic acid, is preferably 4 to 40% by weight, more preferably 6 to 35% by weight and especially preferably 8 to 32% by weight. The proportion a3) of monomer units of the formula (I) is preferably 4 to 40% by weight, more preferably 4 to 35% by weight and especially 4 to 20% by weight. Without limiting the scope of the invention, the numeric ranges recited are understood to be inclusive of the numbers defining the range and include each integer within the defined range.

If monomers a4) are present in terpolymer (A), the proportion thereof is preferably up to 20% by weight, more preferably up to 15% by weight and especially up to 10% by weight. Without limiting the scope of the invention, the numeric ranges recited are understood to be inclusive of the numbers defining the range and include each integer within the defined range.

Terpolymers (A) preferably have a mean molecular weight $M_w$ of 1,000 to 200,000 g/mol, preferably of 1,000 to 100,000 g/mol, more preferably of 1,000 to 50,000 g/mol, determined by gel permeation chromatography at room temperature with a buffer solution (pH value 7) as an eluent against polyacrylate standards. Without limiting the scope of the invention, the numeric ranges of molecular weights recited are understood to be inclusive of the numbers defining the range and include each integer within the defined range.

The K values of preferred terpolymers (A) are in the range of from 15 to 100, preferably 20 to 80, more preferably 30 to 50, measured at pH 7 in 1% by weight aqueous solution at 25° C. according to H. Fikentscher, Cellulose-Chemie volume 13, pages 58-64 and 71-74 (1932). Without limiting the scope of the invention, the numeric ranges recited are understood to be inclusive of the numbers defining the range and include each integer within the defined range.

Terpolymers (A) can be prepared by free-radical polymerization of the monomers. It is possible to work by any known free-radical polymerization process. In addition to polymerization in bulk, mention should be made especially of the processes of solution polymerization and emulsion polymerization, preference being given to solution polymerization.

The polymerization is preferably performed in water as a solvent. However, it can also be undertaken in alcoholic solvents, especially $C_1$-$C_4$-alcohols, such as methanol, ethanol and isopropanol, or mixtures of these solvents with water.

Suitable polymerization initiators are compounds which decompose thermally, by a redox mechanism or photochemically (photoinitiators) to form free radicals.

Among the thermally active polymerization initiators, preference is given to initiators having a decomposition temperature in the range from 20 to 180° C., especially from 50 to 90° C. Examples of suitable thermal initiators are inorganic peroxo compounds such as peroxodisulfates (ammonium peroxodisulfate and preferably sodium peroxodisulfate), peroxosulfates, percarbonates and hydrogen peroxide; organic peroxo compounds such as diacetyl peroxide, di-tert-butyl peroxide, diamyl peroxide, dioctanoyl peroxide, didecanoyl peroxide, dilauroyl peroxide, dibenzoyl peroxide, bis(o-tolyl) peroxide, succinyl peroxide, tert-butyl perneodecanoate, tert-butyl perbenzoate, tert-butyl perisobutyrate, tert-butyl perpivalate, tert-butyl peroctoate, tert-butyl perneodecanoate, tert-butyl perbenzoate, tert-butyl peroxide, tert-butyl hydroperoxide, cumene hydroperoxide, tert-butyl peroxy-2-ethylhexanoate and diisopropyl peroxydicarbamate; azo compounds such as 2,2'-azobisisobutyronitrile, 2,2'-azobis(2-methylbutyronitrile) and azobis(2-amidopropane)dihydrochloride.

Any of the above initiators can be used in combination with reducing compounds as initiator/regulator systems. Examples of such reducing compounds include phosphorus compounds such as phosphorous acid, hypophosphites and phosphinates, sulfur compounds such as sodium hydrogensulfite, sodium sulfite and sodium formaldehyde-sulfoxylate, and hydrazine.

Also frequently used are redox initiator systems which consist of a peroxo compound, a metal salt and a reducing agent. Examples of suitable peroxo compounds are hydrogen peroxide, peroxodisulfate (as the ammonium, sodium or potassium salt), peroxosulfates, and organic peroxo compounds such as tert-butyl hydroperoxide, cumene hydroperoxide or dibenzoyl peroxide. Suitable metal salts are in particular iron(II) salts such as iron(II) sulfate heptahydrate. Suitable reducing agents are sodium sulfite, the disodium salt of 2-hydroxy-2-sulfinatoacetic acid, the disodium salt of 2-hydroxy-2-sulfonatoacetic acid, sodium hydroxymethanesulfinate, ascorbic acid, isoascorbic acid or mixtures thereof.

Examples of suitable photoinitiators are benzophenone, acetophenone, benzyl dialkyl ketones and derivatives thereof.

Preference is given to using thermal initiators, preference being given to inorganic peroxo compounds, especially sodium peroxodisulfate. The peroxo compounds are particularly advantageously used in combination with sulfur-containing reducing agents, especially sodium hydrogensulfite, as the redox initiator system. In the case of use of this initiator/regulator system, copolymers comprising —$SO_3^-Na^+$ and/or —$SO_4^-Na^+$ as end groups are obtained, which are notable for exceptional cleaning power and scale-inhibiting action.

Alternatively, it is also possible to use phosphorus-containing initiator/regulator systems, for example hypophosphites/phosphinates.

The amounts of photoinitiator and initiator/regulator system should be matched to the substances used in each case. If, for example, the preferred peroxodisulfate/hydrogensulfite system is used, typically 2 to 6% by weight, preferably 3 to 5% by weight, of peroxodisulfate and generally 5 to 30% by weight, preferably 5 to 10% by weight, of hydrogensulfite are used, based in each case on the monomers a1), a2), a3) and optionally a4).

If desired, it is also possible to use polymerization regulators. Suitable examples are sulfur compounds such as mercaptoethanol, 2-ethylhexyl thioglycolate, thioglycolic acid and dodecyl mercaptan. When polymerization regulators are used, the amount thereof used is generally 0.1 to 15% by weight, preferably 0.1 to 5% by weight and more preferably 0.1 to 2.5% by weight, based on monomers a1), a2), a3) and optionally a4).

The polymerization temperature is generally 20 to 200° C., preferably 20 to 150° C., and more preferably 20 to 120° C.

The polymerization can be performed under atmospheric pressure, but is preferably undertaken in a closed system under the autogenous pressure which evolves.

Terpolymers (A) can be obtained in the acidic state, but they can also, if desired for the application, be neutralized or partly neutralized by addition of bases, especially of sodium hydroxide solution, as early as during the polymerization or after the polymerization has ended. The preferred pH of the aqueous solutions is in the range from 3 to 8.5.

Terpolymers (A) used can be used directly in the form of the aqueous solutions obtained in the course of preparation by means of solvent polymerization in water, or in dried form (obtained, for example, by spray drying, spray granulation, fluidized spray drying, roller drying or freeze drying).

In a further aspect of the invention, the terpolymers (A) may include additional monomer units, in addition to those units a1), a2), a3), and a4) described herein, to the extent the additional monomer unit(s) do not interfere with the solidification and/or scale control provided by the detergent compositions and/or the additional performance benefits described herein. In a preferred aspect, the terpolymers (A) do not include additional monomer units.

In one embodiment, a detergent composition according to the invention may contain less than 60% by weight (active amount) of the terpolymer (A), more particularly, less than about 55% by weight terpolymer (A). In another embodiment, a detergent composition according to the invention may contain between about 5% and 50% by weight terpolymer (A), more particularly, between about 10% and 40% by weight terpolymer (A).

Source of Alkalinity

Detergent compositions according to the invention include at least about 50% of alkali metal hydroxide to enhance cleaning and improve soil removal performance. In general, it is expected that a concentrated detergent composition will include the alkaline source in an amount of at least about 50% by weight of alkali metal hydroxide. In order to provide sufficient room for other components in the concentrate alkali metal hydroxide can be provided in the concentrate in an amount of less than about 95% by weight, less than about 90% by weight, or less than about 85% by weight. Without limiting the scope of the invention, the numeric ranges recited are understood to be inclusive of the numbers defining the range and include each integer within the defined range.

An effective amount of one or more alkaline sources should be considered as an amount that provides a use composition having a pH of at least about 8 and usually between about 9.5 and 14. When the use composition has a pH of between about 8 and about 10, it can be considered mildly alkaline, and when the pH is greater than about 13, the use composition can be considered caustic. In some circumstances, the detergent composition may provide a use composition that is useful at pH levels below about 8. In such compositions, the alkaline source may be omitted, and additional pH adjusting agents may be used to provide the use composition with the desired pH.

Examples of suitable alkaline sources of the detergent composition include, but are not limited to alkali metal carbonates and alkali metal hydroxides. In a preferred aspect the alkalinity source is an alkali metal hydroxide. Exemplary alkali metal carbonates that can be used include, but are not limited to: sodium or potassium carbonate, bicarbonate, sesquicarbonate, and mixtures thereof.

Exemplary alkali metal hydroxides that can be used include, but are not limited to sodium, lithium, or potassium hydroxide, preference being given to sodium hydroxide. The alkali metal hydroxide may be added to the detergent composition in any form known in the art, including as solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 45% and a 50% by weight solution. In one embodiment, the alkali metal hydroxide is added in the form of an aqueous solution, particularly a 50% by weight hydroxide solution, to reduce the amount of heat generated in the composition due to hydration of the solid alkali material.

In addition to the first alkalinity source, the detergent composition may comprise a secondary alkalinity source. Examples of useful secondary alkaline sources include, but are not limited to: metal silicates such as sodium or potassium silicate or metasilicate; metal carbonates such as sodium or potassium carbonate, bicarbonate, sesquicarbonate and mixtures thereof; metal borates such as sodium or potassium borate; and ethanolamines and amines. Such alkalinity agents are commonly available in either aqueous or powdered form, either of which is useful in formulating the present detergent compositions.

Exemplary silicates include for example, crystalline sheet-type silicates with the general formula $NaMSi_aO_{2a+1} \cdot bH_2O$, where M is sodium or hydrogen, a is from 1.9 to 22, preferably from 1.9 to 4, particularly preferred values for b being 2, 3 or 4, and y is from 0 to 33, preferably 0 to 20. In addition, amorphous sodium silicates with a $SiO_2:Na_2O$ ratio of 1 to 3.5, preferably of 1.6 to 3 and especially of 2 to 2.8 can be used.

Detergent compositions according to the invention are phosphate-free. Phosphate-free (also referred to as "free of phosphate") means a detergent composition according to the present invention that contains less than approximately 0.5 wt %, more particularly, less than approximately 0.1 wt %, and even more particularly less than approximately 0.01 wt % phosphate based on the total solids content of said detergent composition. In other embodiments of the invention, the detergent compositions are low-phosphate compositions containing below at least about 20 wt-% phosphate, below at least about 10 wt-%, below at least about 5 wt-%, or below at least about 1 wt-%.

The detergent compositions according to the invention may in addition be NTA-free (also referred to as "free of NTA") which means a concentrated composition having less than approximately 0.5 wt %, less than approximately 0.1 wt %, and often less than approximately 0.01 wt % NTA based on the total solids content of said detergent composition.

Optional Additional Polymer/phosphonate

Detergent compositions according to the present invention may contain one or more additional polymers and/or a phosphonate in addition to terpolymer (A). Examples of suitable additional polymers include polyacrylic acid, polymethacrylic acid, polymaleic acid homopolymers, copolymers of acrylic methacrylic or maleic acids (and combinations thereof). Other polymers which may be included are acrylic acid, methacrylic acid, and/or maleic acid polymers, copolymers or terpolymers. Any of the additional polymers may be hydrophobically modified. Additional polymer if present is general present in an amount of from about 0-20 wt-%; preferably from about 0-15 wt-% and more preferably from about 0-10 wt-%. Without limiting the scope of the invention, the numeric ranges recited are understood to be inclusive of the numbers defining the range and include each integer within the defined range.

In an aspect, the detergent compositions may include in addition to terpolymer (A) polycarboxylates, which may be hydrophilically or hydrophobically modified. In an aspect, the additional polycarboxylate polymers may be present in amounts up to about 20% by weight.

Suitable examples are alkali metal salts of homo- and copolymers of acrylic acid or of methacrylic acid. Suitable for copolymerization are monoethylenically unsaturated dicarboxylic acids such as maleic acid, fumaric acid, maleic anhydride, itaconic acid and citraconic acid. A suitable polycarboxylate is especially polyacrylic acid, which preferably has a molar mass ($M_w$) of 1,000 to 40,000 g/mol. Due to its superior solubility, among this group, preference may be given to short-chain polyacrylic acid which has a molar mass ($M_w$) of from 1,000 to 10,000 g/mol, especially 1,000 to 8,000 g/mol. Also suitable are copolymeric polycarboxylates, especially those of acrylic acid with methacrylic acid and of acrylic acid or methacrylic acid with maleic acid and/or fumaric acid.

It is also possible to use copolymers of at least one monomer from the group consisting of monoethylenically unsaturated $C_3$-$C_{10}$-mono- or dicarboxylic acids or anhydrides thereof, such as maleic acid, maleic anhydride, acrylic acid, methacrylic acid, fumaric acid, itaconic acid and citraconic acid with at least one hydrophilically or hydrophobically modified monomer, as enumerated hereinafter.

Suitable hydrophobic monomers are, for example, isobutene, diisobutene, butene, pentene, hexene and styrene, olefins having 10 or more carbon atoms or mixtures thereof, for example 1-decene, 1-dodecene, 1-tetradecene, 1-hexadecene, 1-octadecene, 1-eicosene, 1-docosene, 1-tetracosene and 1-hexacosene, $C_{22}$-alpha-olefin, a mixture of $C_{20}$-$C_{24}$-alpha-olefins and polyisobutene having an average of 12 to 100 carbon atoms.

Suitable hydrophilic monomers are monomers with sulfonate or phosphonate groups, and nonionic monomers with a hydroxyl function or alkylene oxide groups. Examples include: allyl alcohol, isoprenol, methoxy polyethylene glycol(meth)acrylate, methoxy polypropylene glycol(meth)acrylate, methoxy polybutylene glycol(meth)acrylate, methoxy poly(propylene oxide-co-ethylene oxide)(meth)acrylate, ethoxy polyethylene glycol(meth)acrylate, ethoxy polypropylene glycol(meth)acrylate, ethoxy polybutylene glycol(meth)acrylate and ethoxy poly(propylene oxide-co-ethylene oxide)(meth)-acrylate. The polyalkylene glycols comprise 3 to 50, especially 5 to 40 and in particular 10 to 30 alkylene oxide units.

Particularly preferred sulfo-containing monomers are 1-acrylamido-1-propanesulfonic acid, 2-acrylamido-2-propanesulfonic acid, 2-acrylamido-2-methylpropanesulfonic acid, 2-methacrylamido-2-methylpropanesulfonic acid, 3-methacrylamido-2-hydroxypropane-sulfonic acid, allylsulfonic acid, methallylsulfonic acid, allyloxybenzenesulfonic acid, methallyloxybenzenesulfonic acid, 2-hydroxy-3-(2-propenyloxyl)propanesulfonic acid, 2-methyl-2-propene-1-sulfonic acid, styrenesulfonic acid, vinylsulfonic acid, 3-sulfopropyl acrylate, 2-sulfoethyl methacrylate, 3-sulfopropyl methacrylate, sulfomethacrylamide, sulfomethylmethacrylamide, and salts of the acids mentioned, such as the sodium, potassium or ammonium salts thereof.

Particularly preferred monomers containing phosphonate groups are vinylphosphonic acid and salts thereof.

Furthermore, it is also possible to additionally use amphoteric and cationic polymers.

Water

The detergent compositions according to the invention may comprise water in amounts that vary depending upon techniques for processing the composition.

Water provides a medium which dissolves, suspends, or carries the other components of the composition. Water can also function to deliver and wet the composition of the invention on an object.

In some embodiments, water makes up a large portion of the detergent compositions of the invention and may be the balance of the detergent composition apart from source of alkalinity, terpolymer (A), additional ingredients, and the like. The water amount and type will depend upon the nature of the composition as a whole, the environmental storage, and method of application including concentration composition, form of the composition, and intended method of deliver, among other factors. Notably the carrier should be chosen and used at a concentration which does not inhibit the efficacy of the functional components in the composition of the invention for the intended use, e.g., bleaching, sanitizing, cleaning.

In certain embodiments, the present composition includes about 1 to about 90 wt-% water, about 10 to about 80 wt % water, about 20 to about 60 wt % water, or about 30 to about 40 wt % water. It is to be understood that all values and ranges between these values and ranges are encompassed by the present invention.

When preparing a solid detergent composition water may be present in the ranges of between about 15% and about 50% by weight, particularly between about 20% and about 45% by weight, and more particularly between about 22% and about 40% by weight. Without limiting the scope of the invention, the numeric ranges recited are understood to be inclusive of the numbers defining the range and include each integer within the defined range.

Additional Functional Materials

The components of the detergent composition according to the present invention can be combined with various additional functional components. In some embodiments, alkali metal hydroxide and terpolymer (A) and water make up a large amount, or even substantially all of the total weight of the detergent composition, for example, in embodiments having few or no additional functional materials disposed therein. In these embodiments, the component concentrations ranges provided above for the detergent composition are representative of the ranges of those same components in the detergent composition.

For the purpose of this application, the term "functional materials" includes a material that when dispersed or dissolved in a use and/or concentrate, such as an aqueous solution, provides a beneficial property in a particular use. Some particular examples of functional materials are discussed in more detail below, although the particular materials discussed are given by way of example only, and that a broad variety of other functional materials may be used. For example, many of the functional materials discussed below relate to materials used in cleaning and/or destaining applications. However, other embodiments may include functional materials for use in other applications.

Surfactants

Detergent compositions according to the present invention can include at least one cleaning agent comprising a surfactant or surfactant system. A variety of surfactants can be used in inventive detergent compositions, including, but not limited to: anionic, nonionic, cationic, and zwitterionic surfactants. In a preferred aspect, nonionic surfactants are included in detergent compositions according to the present invention. Surfactants are an optional component of detergent compositions according to the present invention and can be excluded from the concentrate. Exemplary surfactants that can be used are commercially available from a number of sources. For a discussion of surfactants, see Kirk-Othmer, Encyclopedia of Chemical Technology, Third Edition, volume 8, pages 900-912. When the detergent composition includes a cleaning agent, the cleaning agent is provided in an amount effective to provide a desired level of cleaning. The detergent composition, when provided as a concentrate, can include the cleaning agent in a range of about 0.05% to about 20% by weight, about 0.5% to about 15% by weight, about 1% to about 15% by weight, about 1.5% to about 10% by weight, and about 2% to about 8% by weight. Additional exemplary ranges of surfactant in a concentrate include about 0.5% to about 8% by weight, and about 1% to about 5% by weight. Without limiting the scope of the invention, the numeric ranges recited are understood to be inclusive of the numbers defining the range and include each integer within the defined range.

Examples of anionic surfactants useful in detergent compositions according to the present invention include, but are not limited to: carboxylates such as alkylcarboxylates and polyalkoxycarboxylates, alcohol ethoxylate carboxylates, nonylphenol ethoxylate carboxylates; sulfonates such as alkylsulfonates, alkylbenzenesulfonates, alkylarylsulfonates, sulfonated fatty acid esters; sulfates such as sulfated alcohols, sulfated alcohol ethoxylates, sulfated alkylphenols, alkylsulfates, sulfosuccinates, and alkylether sulfates. Exemplary anionic surfactants include, but are not limited to: sodium alkylarylsulfonate, alpha-olefinsulfonate, and fatty alcohol sulfates.

Examples of nonionic surfactants useful in detergent compositions according to the present invention include, but are not limited to, those having a polyalkylene oxide polymer as a portion of the surfactant molecule. Such nonionic surfactants include, but are not limited to: chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated amines such as alkoxylated ethylene diamine; alcohol alkoxylates such as alcohol ethoxylate propoxylates, alcohol propoxylates, alcohol propoxylate ethoxylate propoxylates, alcohol ethoxylate butoxylates; nonylphenol ethoxylate, polyoxyethylene glycol ether; carboxylic acid esters such as glycerol esters, polyoxyethylene esters, ethoxylated and glycol esters of fatty acids; carboxylic amides such as diethanolamine condensates, monoalkanolamine condensates, polyoxyethylene fatty acid amides; and polyalkylene oxide block copolymers. An example of a commercially available ethylene oxide/propylene oxide block copolymer includes, but is not limited to, PLURONIC®, available from BASF Corporation, Florham Park, N.J. An example of a commercially available silicone surfactant includes, but is not limited to, ABIL® B8852, available from Goldschmidt Chemical Corporation, Hopewell, Va.

Further examples of nonionic surfactants suitable for use with detergent compositions according to the invention are surfactants of the general formula $$R^{18}-O-(CH_2CH_2O)_p-(CHR^{17}CH_2O)_m-R^{19}$$

in which $R^{18}$ is a linear or branched alkyl radical having 8 to 22 carbon atoms, $R^{17}$ and $R^{19}$ are each independently hydrogen or a linear or branched alkyl radical having 1-10 carbon atoms or H, where $R^{17}$ is preferably methyl, p and m are each independently 0 to 300. Preferably, p=1-100 and m=0-30. The surfactants may be either random copolymers or block copolymers, preferably block copolymers.

Examples of cationic surfactants that can be used in detergent compositions according to the present invention include, but are not limited to: amines such as primary, secondary and tertiary monoamines with $C_{18}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$) dimethylbenzyl ammonium chloride, n-tetradecyldimethylbenzylammonium chloride monohydrate, and a naphthylene-substituted quaternary ammonium chloride such as dimethyl-1-naphthylmethylammonium chloride. The cationic surfactant can be used to provide sanitizing properties.

Examples of zwitterionic surfactants that can be used in detergent compositions according to the present invention include, but are not limited to: betaines, imidazolines, and propionates.

For detergent compositions intended to be used in an automatic dishwashing or warewashing machine, the surfactants selected, if any surfactant is used, can be those that provide an acceptable level of foaming when used inside a dishwashing or warewashing machine. Detergent compositions for use in automatic dishwashing or warewashing machines are generally considered to be low-foaming compositions. Low foaming surfactants that provide the desired level of detersive activity are advantageous in an environment such as a dishwashing machine where the presence of large amounts of foaming can be problematic. In addition to selecting low foaming surfactants, defoaming agents can also be utilized to reduce the generation of foam. Accordingly, surfactants that are considered low foaming surfactants can be used. In addition, other surfactants can be used in conjunction with a defoaming agent to control the level of foaming.

Builders

Detergent compositions according to the present invention can include one or more building agents, also called chelating or sequestering agents (e.g., builders or complexing agents), including, but not limited to: a phosphonate, an aminocarboxylic acid, or a polyacrylate. In general, a chelating agent is a molecule capable of coordinating (i.e., binding) the metal ions commonly found in natural water to prevent the metal ions from interfering with the action of the other detersive ingredients of a cleaning composition. Preferable levels of addition for builders that can also be chelating or sequestering agents are between about 0.1% to about 70% by weight, about 1% to about 60% by weight, or about 1.5% to about 50% by weight. If the detergent is provided as a concentrate, the concentrate can include between approximately 1% to approximately 60% by weight, between approximately 3% to approximately 50% by weight, and between approximately 6% to approximately 45% by weight of the builders. Additional ranges of the builders include between approximately 3% to approximately 20% by weight, between approximately 6% to approximately 15% by weight, between approximately 25% to approximately 50% by weight, and between approximately 35% to approximately 45% by weight. Without limiting the scope of the invention, the numeric ranges recited are understood to be inclusive of the numbers defining the range and include each integer within the defined range.

Examples of phosphonates include, but are not limited to: 2-phosphinobutane-1,2,4-tricarboxylic acid (PBTC), 1-hydroxyethane-1,1-diphosphonic acid, $CH_2C(OH)[PO(OH)_2]_2$; aminotri(methylenephosphonic acid), $N[CH_2PO(OH)_2]_3$; aminotri(methylenephosphonate), sodium salt (ATMP), $N[CH_2PO(ONa)_2]_3$; 2-hydroxyethyliminobis(methylenephosphonic acid), $HOCH_2CH_2N[CH_2PO(OH)_2]_2$; diethylenetriaminepenta(methylenephosphonic acid), $(HO)_2POCH_2N[CH_2CH_2N[CH_2PO(OH)_2]_2]_2$; diethylenetriaminepenta(methylenephosphonate), sodium salt (DTPMP), $C_9H_{(28-x)}N_3Na_xO_{15}P_5$ (x=7); hexamethylenediamine(tetramethylenephosphonate), potassium salt, $C_{10}H_{(28-x)}N_2K_xO_{12}P_4$ (x=6); bis(hexamethylene)triamine (pentamethylenephosphonic acid), $(HO_2)POCH_2N[(CH_2)_2N[CH_2PO(OH)_2]_2]_2$; and phosphorus acid, $H_3PO_3$. Preferred phosphonates are PBTC, HEDP, ATMP and DTPMP. A neutralized or alkali phosphonate, or a combination of the phosphonate with an alkali source prior to being added into the mixture such that there is little or no heat or gas generated by a neutralization reaction when the phosphonate is added is preferred. In another embodiment, however, the detergent composition according to the present invention is phosphonate-free.

Detergent compositions according to the present invention preferably contain a non-phosphate based builder. Although various components may include trace amounts of phosphorous, carboxylates such as citrate, tartrate or gluconate are also suitable. Useful aminocarboxylic acid materials containing little or no NTA include, but are not limited to: N-hydroxyethylaminodiacetic acid, ethylenediaminetetraacetic acid (EDTA), hydroxyethylenediaminetetraacetic acid, diethylenetriaminepentaacetic acid, N-hydroxyethyl-ethylenediaminetriacetic acid (HEDTA), diethylenetriaminepentaacetic acid (DTPA), hydroxyethylethylenediaminetriacetic acid and methylglycinediacetic acid (MGDA), glutamic acid-diacetic acid (GLDA), iminodisuccinic acid (IDA), hydroxyiminodisuccinic acid, ethylenediaminedisuccinic acid (EDDS), aspartic acid-diacetic acid, and salts thereof. Particularly preferred building agents are MGDA and GLDA and salts thereof and/or other similar acids having an amino group with a carboxylic acid substituent.

In an aspect, preferred building agents are selected from the group consisting of ethylenediaminetetraacetic acid, diethylenetriaminepentaacetic acid, hydroxyethylethylenediaminetriacetic acid and methylglycinediacetic acid, glutamic acid-diacetic acid, iminodisuccinic acid, hydroxyiminodisuccinic acid, ethylenediaminedisuccinic acid, aspartic acid-diacetic acid, and salts thereof. Particularly preferred building agents are methylglycinediacetic acid and salts thereof.

Water conditioning polymers can be used as non-phosphate- or phosphorus containing builders. Exemplary water conditioning polymers include, but are not limited to: polycarboxylates. Exemplary polycarboxylates that can be used as builders and/or water conditioning polymers include, but are not limited to: those having pendant carboxylate ($—CO_2^-$) groups such as polyacrylic acid, maleic acid, maleic/olefin copolymer, sulfonated copolymer or terpolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. These materials may also be used at substoichiometric levels to function as crystal modifiers The polymers may also include water-soluble or water-insoluble substances, the main task of which consists in the binding of calcium and magnesium ions. These may be low molecular weight carboxylic acids and salts thereof, such as alkali metal citrates, especially anhydrous trisodium citrate or trisodium citrate dihydrate, alkali metal succinates, alkali metal malonates, fatty acid sulfonates, oxidisuccinate, alkyl or alkenyl disuccinates, gluconic acids, oxadiacetates, carboxymethyloxysuccinates, tartrate monosuccinate, tartrate disuccinate, tartrate monoacetate, tartrate diacetate and a-hydroxypropionic acid.

Hardening Agents

Detergent compositions according to the present invention can include a hardening agent in addition to, or in the form of, the builder. A hardening agent is a compound or system of compounds, organic or inorganic, which significantly contributes to the uniform solidification of the composition. Preferably, the hardening agents are compatible with the cleaning agent and other active ingredients of the composition and are capable of providing an effective amount of hardness and/or aqueous solubility to the processed composition. The hardening agents should also be capable of forming a homogeneous matrix with the cleaning agent and other ingredients when mixed and solidified to provide a uniform dissolution of the cleaning agent from the solid detergent composition during use.

The amount of hardening agent included in a detergent composition according to the present invention will vary according to factors including, but not limited to: the type of detergent composition being prepared, the ingredients of the detergent composition, the intended use of the composition, the quantity of dispensing solution applied to a solid detergent composition over time during use, the temperature of dispensing solution, the hardness of the dispensing solution, the physical size of the solid detergent composition, the concentration of the other ingredients, and the concentration of cleaning agent in the composition. It is preferred that the amount of the hardening agent included in a solid detergent composition according to the present invention is effective to combine with the cleaning agent and other ingredients of the composition to form a homogeneous mixture under continuous mixing conditions and a temperature at or below the melting temperature of hardening agent.

It is also preferred that the hardening agent form a matrix with the cleaning agent and other ingredients which will harden to a solid form under ambient temperatures of approximately 30° C. to approximately 50° C., particularly approximately 35° C. to approximately 45° C., after mixing ceases and the mixture is dispensed from the mixing system, within approximately 1 minute to approximately 3 hours, particularly approximately 2 minutes to approximately 2 hours, and particularly approximately 5 minutes to approximately 1 hour. A minimal amount of heat from an external source may be applied to the mixture to facilitate processing of the mixture. It is preferred that the amount of the hardening agent included in the solid detergent composition is effective to provide a desired hardness and desired rate of controlled solubility of the processed composition when placed in an aqueous medium to achieve a desired rate of dispensing the cleaning agent from the solidified composition during use.

The hardening agent may be an organic or an inorganic hardening agent. A preferred organic hardening agent is a polyethylene glycol (PEG) compound. The solidification rate of solid detergent compositions comprising a polyethylene glycol hardening agent will vary, at least in part, according to the amount and the molecular weight of the polyethylene glycol added to the composition. Examples of suitable polyethylene glycols include, but are not limited to: solid polyethylene glycols of the general formula $H(OCH_2CH_2)_nOH$, where n is greater than 15, particularly approximately 30 to approximately 1700. Typically, the polyethylene glycol is a solid in the form of a free-flowing powder or flakes, having a molecular weight of approximately 1,000 to approximately 100,000, particularly having a molecular weight of at least approximately 1,450 to approximately 20,000, more particularly between approximately 1,450 to approximately 8,000. The polyethylene glycol is present at a concentration of from approximately 1% to 75% by weight and particularly approximately 3% to approximately 15% by weight. Suitable polyethylene glycol compounds include, but are not limited to: PEG 4000, PEG 1450, and PEG 8000 among others, with PEG 4000 and PEG 8000 being most preferred. An example of a commercially available solid polyethylene glycol includes, but is not limited to: CARBOWAX, available from Union Carbide Corporation, Houston, Tex.

Preferred inorganic hardening agents are hydratable inorganic salts, including, but not limited to: sulfates and bicarbonates. The inorganic hardening agents are present at concentrations of up to approximately 50% by weight, particularly approximately 5% to approximately 25% by weight, and more particularly approximately 5% to approximately 15% by weight. Without limiting the scope of the invention, the numeric ranges recited are understood to be inclusive of the numbers defining the range and include each integer within the defined range.

Urea particles can also be employed as hardeners in detergent compositions according to the present invention. The solidification rate of the compositions will vary, at least in part, to factors including, but not limited to: the amount, the particle size, and the shape of the urea added to the composition. For example, a particulate form of urea can be combined with a cleaning agent and other ingredients, and preferably a minor but effective amount of water. The amount and particle size of the urea is effective to combine with the cleaning agent and other ingredients to form a homogeneous mixture without the application of heat from an external source to melt the urea and other ingredients to a molten stage. It is preferred that the amount of urea included in the solid detergent composition is effective to provide a desired hardness and desired rate of solubility of the composition when placed in an aqueous medium to achieve a desired rate of dispensing the cleaning agent from the solidified composition during use. In some embodiments, the composition includes between approximately 5% to approximately 90% by weight urea, particularly between approximately 8% and approximately 40% by weight urea, and more particularly between approximately 10% and approximately 30% by weight urea. Without limiting the scope of the invention, the numeric ranges recited are understood to be inclusive of the numbers defining the range and include each integer within the defined range.

Urea may be in the form of prilled beads or powder. Prilled urea is generally available from commercial sources as a mixture of particle sizes ranging from about 8-15 U.S. mesh, as for example, from Arcadian Sohio Company, Nitrogen Chemicals Division. A prilled form of urea is preferably milled to reduce the particle size to about 50 U.S. mesh to about 125 U.S. mesh, particularly about 75-100 U.S. mesh, preferably using a wet mill such as a single or twin-screw extruder, a Teledyne mixer, a Ross emulsifier, and the like.

Bleaching Agents

Bleaching agents suitable for use in detergent composition according to the present invention for lightening or whitening a substrate include bleaching compounds capable of liberating an active halogen species, such as $Cl_2$, $Br_2$, $—OCl^-$ and/or $—OBr^-$, under conditions typically encountered during the cleansing process. Suitable bleaching agents for use in the detergent compositions include, but are not limited to: chlorine-containing compounds such as chlorines, hypochlorites, or chloramines. Chlorine bleaches and the combination of chlorine bleaches with peroxidic bleaches can likewise be used. Known chlorine bleaches are, for example, 1,3-dichloro-5,5-dimethylhydantoin, N-chlorosulfamide, chloramine T, dichloramine T, chloramine B, N,N'-dichlorobenzoylurea, dichloro-p-toluenesulfonamide or trichloroethylamine. Preferred chlorine bleaches are sodium hypochlorite, calcium hypochlorite, potassium hypochlorite, magnesium hypochlorite, potassium dichloroisocyanurate or sodium dichloroisocyanurate.

Exemplary halogen-releasing compounds include, but are not limited to: the alkali metal dichloroisocyanurates, chlorinated trisodium phosphate, the alkali metal hypochlorites, monochloramine, and dichloramine. Encapsulated chlorine sources may also be used to enhance the stability of the chlorine source in the composition (see, for example, U.S. Pat. Nos. 4,618,914 and 4,830,773, the entire disclosures of which are incorporated by reference herein).

A bleaching agent may also be a peroxygen or active oxygen source such as hydrogen peroxide, perborates, persulfate, sodium carbonate peroxyhydrate, potassium permonosulfate, and sodium perborate mono and tetrahydrate, with and without activators such as tetraacetylethylene diamine. Typical oxygen bleaches are also organic peracids, for example perbenzoic acid, peroxy-alpha-naphthoic acid, peroxylauric acid, peroxystearic acid, phthalimidoperoxycaproic acid, 1,12-diperoxydodecanedioic acid, 1,9-diperoxyazelaic acid, diperoxoisophthalic acid or 2-decyldiperoxybutane-1,4-dioic acid. In addition, the following oxygen bleaches may also find use in the detergent formulation: Cationic peroxy acids described in patent applications U.S. Pat. No. 5,422,028, U.S. Pat. No. 5,294,362 and U.S. Pat. No. 5,292,447, and sulfonyl peroxy acids described in patent application U.S. Pat. No. 5,039,447, each of which are herein incorporated by reference in their entirety.

It is additionally possible to add small amounts of bleach stabilizers, for example phosphonates, borates, metaborates, metasilicates or magnesium salts. Bleach activators are compounds which, under perhydrolysis conditions, give rise to aliphatic peroxocarboxylic acids having preferably 1 to 10 carbon atoms, especially 2 to 4 carbon atoms, and/or substituted perbenzoic acid. Suitable compounds are those which comprise one or more N- or O-acyl groups and/or optionally substituted benzoyl groups, for example substances from the class of the anhydrides, esters, imides, acylated imidazoles or oximes. Examples are tetraacetylethylenediamine (TAED), tetraacetylmethylenediamine (TAMD), tetraacetylglycoluril (TAGU), tetraacetylhexylenediamine (TAHD), N-acylimides, for example N-nonanoylsuccinimide (NOSI), acylated phenolsulfonates, for example n-nonanoyl- or isononanoyloxybenzenesulfonates (n- or iso-NOBS), pentaacetylglucose (PAG), 1,5-diacetyl-2,2-dioxohexahydro-1,3,5-triazine (DADHT) or isatoic anhydride (ISA). Likewise suitable as bleach activators are nitrile quats, for example N-methylmorpholinioacetonitrile salts (MMA salts) or trimethylammonioacetonitrile salts (TMAQ salts).

Preferentially suitable bleach activators are those from the group consisting of polyacylated alkylenediamines, more preferably TAED, N-acylimides, more preferably NOSI, acylated phenolsulfonates, more preferably n- or iso-NOBS, MMA and TMAQ.

Bleach activators are used in amounts of generally 0.1 to 10% by weight, preferably of 1 to 9% by weight, more preferably of 1.5 to 8% by weight, based on the overall detergent formulation. Without limiting the scope of the invention, the numeric ranges recited are understood to be inclusive of the numbers defining the range and include each integer within the defined range.

In addition to the conventional bleach activators, it is also possible for what are called bleach catalysts to be present. These substances are bleach-boosting transition metal salts or transition metal complexes, for example manganese-, iron-, cobalt-, ruthenium- or molybdenum-salen complexes or -carbonyl complexes. Usable bleach catalysts are also manganese, iron, cobalt, ruthenium, molybdenum, titanium, vanadium and copper complexes with nitrogen-containing tripod ligands, and cobalt-, iron-, copper- and ruthenium-amine complexes.

When the concentrate includes a bleaching agent, it can be included in an amount of between approximately 0.1% and approximately 60% by weight, between approximately 1% and approximately 20% by weight, between approximately 3% and approximately 8% by weight, and between approximately 3% and approximately 6% by weight. Without limiting the scope of the invention, the numeric ranges recited are understood to be inclusive of the numbers defining the range and include each integer within the defined range.

Fillers

Detergent compositions according to the present invention can include an effective amount of detergent fillers which do not perform as a cleaning agent per se, but cooperates with the cleaning agent to enhance the overall cleaning capacity of the composition. Examples of detergent fillers suitable for use in the present compositions include, but are not limited to: sodium sulfate and sodium chloride. When the concentrate includes detergent filler, it can be included in an amount up to approximately 50% by weight, between approximately 1% and approximately 30% by weight, or between approximately 1.5% and approximately 25% by weight. Without limiting the scope of the invention, the numeric ranges recited are understood to be inclusive of the numbers defining the range and include each integer within the defined range.

Defoaming Agents

A defoaming agent for reducing the stability of foam may be included in detergent compositions according to the present invention. Examples of defoaming agents include, but are not limited to: ethylene oxide/propylene block copolymers such as those available under the name Pluronic N-3; silicone compounds such as silica dispersed in polydimethylsiloxane, polydimethylsiloxane, and functionalized polydimethylsiloxane such as those available under the name Abil B9952; fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated herein by reference in their entirety.

When the concentrate includes a defoaming agent, the defoaming agent can be provided in an amount of between approximately 0.0001% and approximately 10% by weight, between approximately 0.001% and approximately 5% by weight, or between approximately 0.01% and approximately 1.0% by weight. Without limiting the scope of the invention, the numeric ranges recited are understood to be inclusive of the numbers defining the range and include each integer within the defined range.

Anti-Redeposition Agents

Detergent compositions according to the present invention may include an anti-redeposition agent for facilitating sustained suspension of soils in a cleaning solution and preventing the removed soils from being redeposited onto the substrate being cleaned. Examples of suitable anti-redeposition agents include, but are not limited to: polyacrylates, styrene maleic anhydride copolymers, cellulosic derivatives such as hydroxyethyl cellulose, hydroxypropyl cellulose and carboxymethyl cellulose. When the concentrate includes an anti-redeposition agent, the anti-redeposition agent can be included in an amount of between approximately 0.5% and approximately 10% by weight, and between approximately 1% and approximately 5% by weight. Without limiting the scope of the invention, the numeric ranges recited are understood to be inclusive of the numbers defining the range and include each integer within the defined range.

Stabilizing Agents

Detergent compositions according to the present invention may include stabilizing agents. Examples of suitable stabilizing agents include, but are not limited to: borate, calcium/magnesium ions, propylene glycol, and mixtures thereof. The concentrate need not include a stabilizing agent, but when the concentrate includes a stabilizing agent, it can be included in an amount that provides the desired level of stability of the concentrate. Exemplary ranges of the stabilizing agent include up to approximately 20% by weight, between approximately 0.5% and approximately 15% by weight, and between approximately 2% and approximately 10% by weight. Without limiting the scope of the invention, the numeric ranges recited are understood to be inclusive of the numbers defining the range and include each integer within the defined range.

Dispersants

Detergent compositions according to the present invention may include one or more dispersants. Examples of suitable dispersants that can be used in the detergent composition include, but are not limited to: maleic acid/olefin copolymers, polyacrylic acid, and mixtures thereof. The concentrate need not include a dispersant, but when a dispersant is included it can be included in an amount that provides the desired dispersant properties. Exemplary ranges of the dispersant in the concentrate can be up to approximately 20% by weight, between approximately 0.5% and approximately 15% by weight, and between approximately 2% and approximately 9% by weight. Without limiting the scope of the invention, the numeric ranges recited are understood to be inclusive of the numbers defining the range and include each integer within the defined range.

Enzymes

Enzymes that can be included in detergent compositions according to the present invention include those enzymes that aid in the removal of starch and/or protein stains. Exemplary types of enzymes include, but are not limited to: proteases, alpha-amylases, and mixtures thereof. Exemplary proteases that can be used include, but are not limited to: those derived from *Bacillus licheniformix, Bacillus lenus, Bacillus alcalophilus*, and *Bacillus amyloliquefacins*. Exemplary alpha-amylases include *Bacillus subtilis, Bacillus amyloliquefaceins* and *Bacillus licheniformis*. The concentrate need not include an enzyme, but when the concentrate includes an enzyme, it can be included in an amount that provides the desired enzymatic activity when the detergent composition is provided as a use composition. Exemplary ranges of the enzyme in the concentrate include up to approximately 15% by weight, between approximately 0.5% to approximately 10% by weight, and between approximately 1% to approximately 5% by weight. Without limiting the scope of the invention, the numeric ranges recited are understood to be inclusive of the numbers defining the range and include each integer within the defined range.

Glass and Metal Corrosion Inhibitors

Detergent compositions according to the present invention can include a metal corrosion inhibitor in an amount up to approximately 50% by weight, between approximately 1% and approximately 40% by weight, or between approximately 3% and approximately 30% by weight. Without limiting the scope of the invention, the numeric ranges recited are understood to be inclusive of the numbers defining the range and include each integer within the defined range.

Corrosion inhibitor included in a detergent composition according to the present invention is in an amount sufficient to provide a use solution that exhibits a rate of corrosion and/or etching of glass that is less than the rate of corrosion and/or etching of glass for an otherwise identical use solution except for the absence of the corrosion inhibitor. It is expected that the use solution will include at least approximately 6 parts per million (ppm) of the corrosion inhibitor to provide desired corrosion inhibition properties. It is expected that larger amounts of corrosion inhibitor can be used in the use solution without deleterious effects. It is expected that at a certain point, the additive effect of increased corrosion and/or etching resistance with increasing corrosion inhibitor concentration will be lost, and additional corrosion inhibitor will simply increase the cost of using the detergent composition. The use solution can include between approximately 6 ppm and approximately 300 ppm of the corrosion inhibitor, and between approximately 20 ppm and approximately 200 ppm of the inhibitor. Examples of suitable corrosion inhibitors include, but are not limited to: a combination of a source of aluminum ion and a source of zinc ion, as well as an alkaline metal silicate or hydrate thereof.

The term corrosion inhibitor can refer to the combination of a source of aluminum ion and a source of zinc ion. The source of aluminum ion and the source of zinc ion provide aluminum ion and zinc ion, respectively, when the detergent composition is provided in the form of a use solution. The amount of the corrosion inhibitor is calculated based upon the combined amount of the source of aluminum ion and the source of zinc ion. Anything that provides an aluminum ion in a use solution can be referred to as a source of aluminum ion, and anything that provides a zinc ion when provided in a use solution can be referred to as a source of zinc ion. It is not necessary for the source of aluminum ion and/or the source of zinc ion to react to form the aluminum ion and/or the zinc ion. Aluminum ions can be considered a source of aluminum ion, and zinc ions can be considered a source of zinc ion. The source of aluminum ion and the source of zinc ion can be provided as organic salts, inorganic salts, and mixtures thereof. Exemplary sources of aluminum ion include, but are not limited to: aluminum salts such as sodium aluminate, aluminum bromide, aluminum chlorate, aluminum chloride, aluminum iodide, aluminum nitrate, aluminum sulfate, aluminum acetate, aluminum formate, aluminum tartrate, aluminum lactate, aluminum oleate, aluminum bromate, aluminum borate, aluminum potassium sulfate, aluminum zinc sulfate, and aluminum phosphate. Exemplary sources of zinc ion include, but are not limited to: zinc salts such as zinc chloride, zinc sulfate, zinc nitrate, zinc iodide, zinc thiocyanate, zinc fluorosilicate, zinc dichromate, zinc chlorate, sodium zincate, zinc gluconate, zinc acetate, zinc benzoate, zinc citrate, zinc lactate, zinc formate, zinc bromate, zinc bromide, zinc fluoride, zinc fluorosilicate, and zinc salicylate.

An effective amount of an alkaline metal silicate or hydrate thereof can be employed in a detergent composition according to the present invention to form a stable detergent composition having metal protecting capacity. Such silicates employed in the compositions of the invention are those that have conventionally been used in detergent formulations. For example, typical alkali metal silicates are those powdered, particulate or granular silicates which are either anhydrous or preferably which contain water of hydration (approximately 5% to approximately 25% by weight, particularly approximately 15% to approximately 20% by weight water of hydration). These silicates are preferably sodium silicates and have a $Na_2O:SiO_2$ ratio of approximately 1:1 to approximately 1:5, respectively, and typically contain available water in the amount of from approximately 5% to approximately 25% by weight. In general, the silicates have a $Na_2O:SiO_2$ ratio of approximately 1:1 to approximately 1:3.75, particularly approximately 1:1.5 to approximately 1:3.75 and most particularly approximately 1:1.5 to approximately 1:2.5. A silicate with a $Na_2O:SiO_2$ ratio of approximately 1:2 and approximately 16% to approximately 22% by weight water of hydration, is most preferred. For example, such silicates are available in powder form as GD Silicate and in granular form as Britesil H-20, available from PQ Corporation, Valley Forge, Pa. These ratios may be obtained with single silicate compositions or combinations of silicates which upon combination result in the preferred ratio. The hydrated silicates at preferred ratios, a $Na_2O:SiO_2$ ratio of approximately 1:1.5 to approximately 1:2.5, have been found to provide the optimum metal protection. Hydrated silicates are preferred.

Silicates can be included in detergent compositions according to the present invention to provide for metal protection but are additionally known to provide alkalinity and additionally function as anti-redeposition agents. Exemplary silicates include, but are not limited to: sodium silicate and potassium silicate. The detergent composition can be provided without silicates, but when silicates are included, they can be included in amounts that provide for desired metal protection. The concentrate can include silicates in amounts of at least approximately 1% by weight, at least approximately 5% by weight, at least approximately 10% by weight, and at least approximately 15% by weight. In addition, in order to provide sufficient room for other components in the concentrate, the silicate component can be provided at a level of less than approximately 35% by weight, less than approximately 25% by weight, less than approximately 20% by weight, and less than approximately 15% by weight. Without limiting the scope of the invention, the numeric ranges recited are understood to be inclusive of the numbers defining the range and include each integer within the defined range.

Suitable corrosion inhibitors used may be silver anticorrosives from the group of the triazoles, the benzotriazoles, the bisbenzotriazoles, the aminotriazoles, the alkylaminotriazoles and the transition metal salts or complexes.

Fragrances and Dyes

Various dyes, odorants including perfumes, and other aesthetic enhancing agents can also be included in the composition. Suitable dyes that may be included to alter the appearance of detergent compositions according to the present invention, include, but are not limited to: Direct Blue 86, available from Mac Dye-Chem Industries, Ahmedabad, India; Fastusol Blue, available from Mobay Chemical Corporation, Pittsburgh, Pa.; Acid Orange 7, available from American Cyanamid Company, Wayne, N.J.; Basic Violet 10 and Sandolan Blue/Acid Blue 182, available from Sandoz, Princeton, N.J.; Acid Yellow 23, available from Chemos GmbH, Regenstauf, Germany; Acid Yellow 17, available from Sigma Chemical, St. Louis, Mo.; Sap Green and Metanil Yellow, available from Keyston Analine and Chemical, Chicago, Ill.; Acid Blue 9, available from Emerald Hilton Davis, LLC, Cincinnati, Ohio; Hisol Fast Red and Fluorescein, available from Capitol Color and Chemical Company, Newark, N.J.; and Acid Green 25, Ciba Specialty Chemicals Corporation, Greenboro, N.C.

Fragrances or perfumes that may be included in detergent compositions according to the present invention include, but are not limited to: terpenoids such as citronellol, aldehydes such as amyl cinnamaldehyde, a jasmine such as C1S-jasmine or jasmal, and vanillin.

Thickeners

Detergent compositions according to the present invention can include a rheology modifier or a thickener. The rheology modifier may provide the following functions: increasing the viscosity of the compositions; increasing the particle size of liquid use solutions when dispensed through a spray nozzle; providing the use solutions with vertical cling to surfaces; providing particle suspension within the use solutions; or reducing the evaporation rate of the use solutions.

A rheology modifier may provide a use composition that is pseudo plastic, in other words the use composition or material when left undisturbed (in a shear mode), retains a high viscosity. However, when sheared, the viscosity of the material is substantially but reversibly reduced. After the shear action is removed, the viscosity returns. These properties permit the application of the material through a spray head. When sprayed through a nozzle, the material undergoes shear as it is drawn up a feed tube into a spray head under the influence of pressure and is sheared by the action of a pump in a pump action sprayer. In either case, the viscosity can drop to a point such that substantial quantities of the material can be applied using the spray devices used to apply the material to a soiled surface. However, once the material comes to rest on a soiled surface, the materials can regain high viscosity to ensure that the material remains in place on the soil. Preferably, the material can be applied to a surface resulting in a substantial coating of the material that provides the cleaning components in sufficient concentration to result in lifting and removal of the hardened or baked-on soil. While in contact with the soil on vertical or inclined surfaces, the thickeners in conjunction with the other components of the cleaner minimize dripping, sagging, slumping or other movement of the material under the effects of gravity. The material should be formulated such that the viscosity of the material is adequate to maintain contact between substantial quantities of the film of the material with the soil for at least a minute, particularly five minutes or more.

Examples of suitable thickeners or rheology modifiers are polymeric thickeners including, but not limited to: polymers or natural polymers or gums derived from plant or animal sources. Such materials may be polysaccharides such as large polysaccharide molecules having substantial thickening capacity. Thickeners or rheology modifiers also include clays.

A substantially soluble polymeric thickener can be used to provide increased viscosity or increased conductivity to the use compositions. Examples of polymeric thickeners for the aqueous compositions of the invention include, but are not limited to: carboxylated vinyl polymers such as polyacrylic acids and sodium salts thereof, ethoxylated cellulose, polyacrylamide thickeners, cross-linked, xanthan compositions, sodium alginate and algin products, hydroxypropyl cellulose, hydroxyethyl cellulose, and other similar aqueous thickeners that have some substantial proportion of water solubility. Examples of suitable commercially available thickeners include, but are not limited to: Acusol, available from Rohm & Haas Company, Philadelphia, Pa.; and Carbopol, available from B.F. Goodrich, Charlotte, N.C.

Examples of suitable polymeric thickeners include, but not limited to: polysaccharides. An example of a suitable commercially available polysaccharide includes, but is not limited to, Diutan, available from Kelco Division of Merck, San Diego, Calif. Thickeners for use in the detergent compositions further include polyvinyl alcohol thickeners, such as, fully hydrolyzed (greater than 98.5 mol acetate replaced with the —OH function).

An example of a particularly suitable polysaccharide includes, but is not limited to, xanthans. Such xanthan polymers are preferred due to their high water solubility, and great thickening power. Xanthan is an extracellular polysaccharide of xanthomonas campestras. Xanthan may be made by fermentation based on corn sugar or other corn sweetener byproducts. Xanthan comprises a poly beta-(1-4)-D-Glucopyranosyl backbone chain, similar to that found in cellulose. Aqueous dispersions of xanthan gum and its derivatives exhibit novel and remarkable rheological properties. Low concentrations of the gum have relatively high viscosities which permit it to be used economically. Xanthan gum solutions exhibit high pseudo plasticity, i.e. over a wide range of concentrations, rapid shear thinning occurs that is generally understood to be instantaneously reversible. Non-sheared materials have viscosities that appear to be independent of the pH and independent of temperature over wide ranges. Preferred xanthan materials include crosslinked xanthan materials. Xanthan polymers can be crosslinked with a variety of known covalent reacting crosslinking agents reactive with the hydroxyl functionality of large polysaccharide molecules and can be crosslinked using divalent, trivalent or polyvalent metal ions. Such crosslinked xanthan gels are disclosed in U.S. Pat. No. 4,782,901, which is herein incorporated by reference. Suitable crosslinking agents for xanthan materials include, but are not limited to: metal cations such as Al+3, Fe+3, Sb+3, Zr+4 and other transition metals. Examples of suitable commercially available xanthans include, but are not limited to: KELTROL®, KELZAN® AR, KELZAN® D35, KELZAN® S, KELZAN®XZ, available from Kelco Division of Merck, San Diego, Calif. Known organic crosslinking agents can also be used. A preferred crosslinked xanthan is KELZAN® AR, which provides a pseudo plastic use solution that can produce large particle size mist or aerosol when sprayed.

Methods of Use of the Detergent Compositions of the Invention

The detergent compositions of the invention are further suitable for use in various applications and methods, including any application suitable for an alkaline detergent wherein the prevention of hard water scale accumulation on surfaces is desired. In addition, the methods of the invention are well suited for controlling water hardness buildup on a plurality of surfaces. The methods of the invention prevent moderate to heavy accumulation of hardness and/or the redeposition of soils on treated substrate surfaces which beneficially improving the aesthetic appearance of the surface. In certain embodiments, surfaces in need of hard water scale accumulation prevention, include for example, plastics, metal and/or glass surfaces.

In a beneficial aspect of the invention, the methods of the invention reduce the formation, precipitation and/or deposition of hard water scale, such as calcium carbonate, on hard surfaces contacted by the detergent compositions. In an embodiment, the detergent compositions are employed for the prevention of formation, precipitation and/or deposition of hard water scale on articles such as glasses, plates, silverware, etc. The solid detergent compositions according to the invention beneficially provide such prevention of formation, precipitation and/or deposition of hard water scale despite the high alkalinity of the detergent composition use solutions in the presence of hard water. The detergent compositions are effective at preventing hard water scale accumulation and/or preventing the redeposition of soils in warewashing applications using a variety of water sources, including hard water. In addition, the detergent compositions are suitable for use at temperature ranges typically used in industrial warewashing applications, including for example from about 150° F. to about 165° F. during washing steps and from about 170° F. to about 185° F. during rinsing steps.

In addition, the methods of use of the detergent compositions according to the present invention are also suitable for CIP and/or COP processes to replace the use of bulk detergents leaving hard water residues on treated surfaces. The methods of use may be desirable in additional applications where industrial standards are focused on the quality of the treated surface, such that the prevention of hard water scale accumulation provided by the detergent compositions of the invention are desirable. Such applications may include, but are not limited to, vehicle care, industrial, hospital and textile care.

Additional examples of applications of use for the detergent compositions include, for example, alkaline detergents effective as grill and oven cleaners, ware wash detergents, laundry detergents, laundry presoaks, drain cleaners, hard surface cleaners, surgical instrument cleaners, transportation vehicle cleaning, vehicle cleaners, dish wash presoaks, dish wash detergents, beverage machine cleaners, concrete cleaners, building exterior cleaners, metal cleaners, floor finish strippers, degreasers and burned-on soil removers. In a variety of these applications, cleaning compositions having a very high alkalinity are most desirable and efficacious; however the damage caused by hard water scale accumulation is undesirable.

Use Compositions

The detergent compositions of the present invention include concentrate compositions and use compositions. For example, a concentrate composition can be diluted, for example with water, to form a use composition. In an embodiment, a concentrate composition can be diluted to a use solution before to application to an object. For reasons of economics, the concentrate can be marketed and an end user can dilute the concentrate with water or an aqueous diluent to a use solution.

The level of active components in the concentrate composition is dependent on the intended dilution factor and the desired activity of the hardness control composition. Generally, a dilution of about 1 fluid ounce to about 10 gallons of water to about 10 fluid ounces to about 1 gallon of water is used for aqueous compositions of the present invention. In some embodiments, higher use dilutions can be employed if elevated use temperature (greater than 25° C.) or extended exposure time (greater than 30 seconds) can be employed. In the typical use locus, the concentrate is diluted with a major proportion of water using commonly available tap or service water mixing the materials at a dilution ratio of about 3 to about 40 ounces of concentrate per 100 gallons of water.

In some embodiments, when used in a laundry application, the concentrated compositions can be diluted at a dilution ratio of about 0.1 g/L to about 100 g/L concentrate to diluent, about 0.5 g/L to about 10.0 g/L concentrate to diluent, about 1.0 g/L to about 4.0 g/L concentrate to diluent, or about 1.0 g/L to about 2.0 g/L concentrate to diluent.

In other embodiments, a use composition can include about 0.01 to about 10 wt-% of a concentrate composition and about 90 to about 99.99 wt-% diluent; or about 0.1 to about 1 wt-% of a concentrate composition and about 99 to about 99.9 wt-% diluent.

Amounts of an ingredient in a use composition can be calculated from the amounts listed above for concentrate compositions and these dilution factors.

Laundry Applications

In some aspects, detergent compositions according to the present invention can be employed in laundry applications where hard water is involved. The articles are contacted with a detergent composition of the invention at use temperatures in the range of about 4° C. to 80° C., for a period of time effective to clean the articles. For example, in some embodiments, a detergent composition of the present invention can be injected into the wash or rinse water of a laundry machine. In some embodiments, the soiled fabric is contacted with a detergent composition of the present invention for about 5 to about 30 minutes. Excess liquor can then be removed by rinsing or centrifuging the fabric.

Detergent compositions of the present invention can be used to launder any conventional textile, including but not limited to, cotton, poly-cotton blends, wool, and polyesters.

Detergent compositions of the present invention can be used alone to treat the articles, e.g., textiles, or can be used in conjunction with conventional detergents suitable for the articles to be treated. The compositions of the invention can be used with conventional detergents in a variety of ways, for example, the compositions of the invention can be formulated with a conventional detergent. In other embodiments, the compositions of the invention can be used to treat the article as a separate additive from a conventional detergent. When used as a separate additive, the compositions of the present invention can contact the article to be treated either before of simultaneous with the detergent.

Clean in Place

Other cleaning applications for the detergent compositions of the present invention include any process where hard water may be involved such as clean-in-place systems (CIP), clean-out-of-place systems (COP), textile laundry machines, ultra and nano-filtration systems and indoor air filters. COP systems can include readily accessible systems including wash tanks, soaking vessels, mop buckets, holding tanks, scrub sinks, vehicle parts washers, non-continuous batch washers and systems, and the like. CIP systems include the internal components of tanks, lines, pumps and other process equipment used for processing typically liquid product streams such as beverages, milk, and juices.

Generally, the cleaning of the in-place system or other surface (i.e., removal of unwanted offal therein) is accomplished with a different material such as a formulated alkaline detergent which is introduced with heated water. The compositions of the invention may be introduced during, prior to the cleaning step and are applied or introduced into the system at a use solution concentration in unheated, ambient temperature water. CIP typically employ flow rates on the order of about 40 to about 600 liters per minute, temperatures from ambient up to about 70° C., and contact times of at least about 10 seconds, for example, about 30 to about 120 seconds. The present composition can remain in solution in cold (e.g., 40° F./4° C.) water and heated (e.g., 140° F./60° C.) water. Although it is not normally necessary to heat the aqueous use solution of the present composition, under some circumstances heating may be desirable to further enhance its activity. These materials are useful at any conceivable temperatures.

The Warewashing Process

The inventive detergent compositions of the invention may be generally utilized in any of the conventional, domestic and institutional, warewashing machines.

Typical institutional warewashing processes are either continuous or non-continuous and are conducted in either a single-tank or a multi-tank/conveyor-type machine.

In the conveyor-type system prewash, wash, post-wash rinse and drying zones are generally established using partitions. Wash water is introduced into the post-wash rinsing zone and is passed cascade-fashion back toward the prewash zone while the dirty dishware is transported in a counter-current direction. In an alternative (so called "by-pass") process, this rinse-water is introduced into the pre-wash zone. It may be attractive to combine this "by-pass" process with the method of the present invention, because in this way a pH-gradient is created over the wash tanks, which is likely to lead to more optimal conditions for soil removal. For instance, enzymes—when present in the first component—can become more active at the more neutral pH-conditions resulting from the introduction of acid post-wash rinse composition into the prewash zone. Various multi-tank warewashing machines have the option to rinse only when dishes are passed through the post-wash rinsing section. It can be attractive to combine this option with the method of the present invention, because in that way the volume of the acid rinse solution is limited. Such limited acid rinse volume will only have a limited effect as to its ability to reduce the alkalinity of the main wash solution.

Furthermore, each component of the cleaning system of the invention is applied in the warewashing machine using conventional means such as suitable spray nozzles or jets directed upwards and/or downwards toward the dishware.

The compositions of the invention may be added as a component of the alkaline detergent, or as a pre-wash or even post-wash treatment.

Formulating the Detergent Compositions According to the Present Invention

Detergent compositions according to the present invention can be formulated to handle the expected hard water level in a given environment. That is, the concentration of the composition in a cleaning composition or used alone can be adjusted depending upon several factors at the situs of use including, for example, water hardness level, food soil concentration, alkalinity and the like. In machine warewashing applications, a food soil concentration of about 25 grams per gallon or more is considered high, a concentration of about 15 to about 24 grams per gallon is considered medium, and a concentration of about 14 grams per gallon or less is considered low. Water hardness exhibiting 15 grains per gallon or more is considered high, about 6 to about 14 grains per gallon is considered medium, and about 5 grains per gallon or less is considered low. In a use composition, an alkalinity of about more than 450 ppm or higher is considered high, an alkalinity of about 300 ppm to about 450 ppm is considered medium, and an alkalinity of about 300 ppm or less is considered low.

Forming a Concentrate

Detergent composition according to the present invention may be made using a mixing process. The terpolymer (A) and alkali metal hydroxide and, optionally, one or more other functional ingredients are mixed for an amount of time sufficient to form a final, homogeneous composition. In an exemplary embodiment, the components of the cleaning composition are mixed for approximately 10 minutes.

A solid cleaning composition as used in the present disclosure encompasses a variety of forms including, for example, solids, pellets, blocks, tablets, and powders. By way of example, pellets can have diameters of between about 1 mm and about 10 mm, tablets can have diameters of between about 1 mm and about 10 mm or between about 1 cm and about 10 cm, and blocks can have diameters of at least about 10 cm. It should be understood that the term "solid" refers to the state of the cleaning composition under the expected conditions of storage and use of the solid cleaning composition. In general, it is expected that the cleaning composition will remain a solid when provided at a temperature of up to about 100° F. or lower than about 120° F.

In certain embodiments, the solid cleaning composition is provided in the form of a unit dose. A unit dose refers to a solid cleaning composition unit sized so that the entire unit is used during a single cycle, for example, a single washing cycle of a warewash machine. When the solid cleaning composition is provided as a unit dose, it can have a mass of about 1 g to about 50 g. In other embodiments, the composition can be a solid, a pellet, or a tablet having a size of about 50 g to 250 g, of about 100 g or greater, or about 40 g to about 11,000 g.

In other embodiments, the solid cleaning composition is provided in the form of a multiple-use solid, such as, a block or a plurality of pellets, and can be repeatedly used to generate aqueous cleaning compositions for multiple washing cycles. In certain embodiments, the solid cleaning composition is provided as a solid having a mass of about 5 g to about 10 kg. In certain embodiments, a multiple-use form of the solid cleaning composition has a mass of about 1 to about 10 kg. In further embodiments, a multiple-use form of the solid cleaning composition has a mass of about 5 kg to about 8 kg. In other embodiments, a multiple-use form of the solid cleaning composition has a mass of about 5 g to about 1 kg, or about 5 g and to about 500 g.

The components can be mixed and extruded or cast to form a solid such as pellets, powders or blocks. Heat can be applied from an external source to facilitate processing of the mixture.

A mixing system provides for continuous mixing of the ingredients at high shear to form a substantially homogeneous liquid or semi-solid mixture in which the ingredients are distributed throughout its mass. The mixing system includes means for mixing the ingredients to provide shear effective for maintaining the mixture at a flowable consistency, with a viscosity during processing of about 1,000-1,000,000 cP, preferably about 50,000-200,000 cP. The mixing system can be a continuous flow mixer or a single or twin screw extruder apparatus.

The mixture can be processed at a temperature to maintain the physical and chemical stability of the ingredients, such as at ambient temperatures of about 20-80° C., and about 25-55° C. Although limited external heat may be applied to the mixture, the temperature achieved by the mixture may become elevated during processing due to friction, variances in ambient conditions, and/or by an exothermic reaction between ingredients. Optionally, the temperature of the mixture may be increased, for example, at the inlets or outlets of the mixing system.

An ingredient may be in the form of a liquid or a solid such as a dry particulate, and may be added to the mixture separately or as part of a premix with another ingredient, as for example, the scale control component may be separate from the remainder of the warewash detergent. One or more premixes may be added to the mixture.

The ingredients are mixed to form a substantially homogeneous consistency wherein the ingredients are distributed substantially evenly throughout the mass. The mixture can be discharged from the mixing system through a die or other shaping means. The profiled extrudate can be divided into useful sizes with a controlled mass. The extruded solid can be packaged in film. The temperature of the mixture when discharged from the mixing system can be sufficiently low to enable the mixture to be cast or extruded directly into a packaging system without first cooling the mixture. The time between extrusion discharge and packaging can be adjusted to allow the hardening of the detergent block for better handling during further processing and packaging. The mixture at the point of discharge can be about 20-90° C., and about 25-55° C. The composition can be allowed to harden to a solid form that may range from a low density, sponge-like, malleable, caulky consistency to a high density, fused solid, concrete-like block.

Optionally, heating and cooling devices may be mounted adjacent to mixing apparatus to apply or remove heat in order to obtain a desired temperature profile in the mixer. For example, an external source of heat may be applied to one or more barrel sections of the mixer, such as the ingredient inlet section, the final outlet section, and the like, to increase fluidity of the mixture during processing. Preferably, the temperature of the mixture during processing, including at the discharge port, is maintained preferably at about 20-90° C.

When processing of the ingredients is completed, the mixture may be discharged from the mixer through a discharge die. The solidification process may last from a few minutes to about six hours, depending, for example, on the size of the cast or extruded composition, the ingredients of the composition, the temperature of the composition, and other like factors. Preferably, the cast or extruded composition "sets up" or begins to harden to a solid form within about 1 minute to about 3 hours, preferably about 1 minute to about 2 hours, most preferably about 1 minute to about 1.0 hours minutes.

The concentrate can be provided in the form of a liquid. Various liquid forms include gels and pastes. Of course, when the concentrate is provided in the form of a liquid, it is not necessary to harden the composition to form a solid. In fact, it is expected that the amount of water in the composition will be sufficient to preclude solidification. In addition, dispersants and other components can be incorporated into the concentrate in order to maintain a desired distribution of components.

In aspects of the invention employing packaged solid detergent compositions, the products may first require removal from any applicable packaging (e.g. film). Thereafter, according to certain methods of use, the compositions can be inserted directly into a dispensing apparatus and/or provided to a water source for cleaning according to the invention. Examples of such dispensing systems include for example U.S. Pat. Nos. 4,826,661, 4,690,305, 4,687,121, 4,426,362 and U.S. Pat. Nos. Re 32,763 and 32,818, the disclosures of which are incorporated by reference herein in its entirety. Ideally, a solid detergent composition is configured or produced to closely fit the particular shape(s) of a dispensing system in order to prevent the introduction and dispensing of an incorrect solid product into the apparatus of the present invention. The packaging receptacle or container may be rigid or flexible, and composed of any material suitable for containing the compositions produced according to the invention, as for example glass, metal, plastic film or sheet, cardboard, cardboard composites, paper, and the like. The composition is processed at around 150-170° F. and are generally cooled to 100-150° before packaging. so that processed mixture may be cast or extruded directly into the container or other packaging system without structurally damaging the material. As a result, a wider variety of materials may be used to manufacture the container than those used for compositions that processed and dispensed under molten conditions.

The packaging material can be provided as a water soluble packaging material such as a water soluble packaging film. Exemplary water soluble packaging films are disclosed in U.S. Pat. Nos. 6,503,879; 6,228,825; 6,303,553; 6,475,977; and 6,632,785, the disclosures of which are incorporated herein by reference in their entirety. An exemplary water soluble polymer that can provide a packaging material that can be used to package the concentrate includes polyvinyl alcohol. The packaged concentrate can be provided as unit dose packages or multiple dose packages. In the case of unit dose packages, it is expected that a single packaged unit will be placed in a dishwashing machine, such as the detergent compartment of the dishwashing machine, and will be used up during a single wash cycle. In the case of a multiple dose package, it is expected that the unit will be placed in a hopper and a stream of water will erode a surface of the concentrate to provide a liquid concentrate that will be introduced into the dishwashing machine.

In certain embodiments, the detergent composition may be mixed with a water source prior to or at the point of use. In other embodiments, the detergent compositions do not require the formation of a use solution and/or further dilution and may be used without further dilution.

In aspects of the invention employing solid detergent compositions, a water source contacts the detergent composition to convert solid detergent compositions, particularly powders, into use solutions. Additional dispensing systems may also be utilized which are more suited for converting alternative solid detergents compositions into use solutions. The methods of the present invention include use of a variety of solid detergent compositions, including, for example, extruded blocks or "capsule" types of package.

In an aspect, a dispenser may be employed to spray water (e.g. in a spray pattern from a nozzle) to form a detergent use solution. For example, water may be sprayed toward an apparatus or other holding reservoir with the detergent composition, wherein the water reacts with the solid detergent composition to form the use solution. In certain embodiments of the methods of the invention, a use solution may be configured to drip downwardly due to gravity until the dissolved solution of the detergent composition is dispensed for use according to the invention. In an aspect, the use solution may be dispensed into a wash solution of a ware wash machine.

Formulations of the Invention

Use Formulations:

According to the invention, use formulations may be made according to the following:

| Formulation | Preferred | More preferred | Most preferred |
|---|---|---|---|
| Sodium Hydroxide | 1-1000 ppm | 1-750 ppm | 1-600 ppm |
| Terpolymer | 5-500 ppm | 5-350 ppm | 5-250 ppm |
| Additional polymer (optional) | 0-500 ppm | 0-350 ppm | 0-250 ppm |
| Phosphonate | 0-50 ppm | 0-30 ppm | 0-20 ppm |

Concentrate Formulations:

According to the invention, concentrate compositions may include the following amounts in percent by weight:

| Formulation | Preferred | More preferred | Most preferred |
|---|---|---|---|
| Sodium Hydroxide | 1-90 | 50-90 | 50-80 |
| Terpolymer | 1-60 | 5-50 | 10-40 |
| Additional polymer (optional) | 0-70 | 0-60 | 0-50 |
| Phosphonate | 0-10 | 0-7 | 0-5 |

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Examples 1-10 were formulated by combining the materials identified in Table below.

All above detergents were evaluated using a concentration of 750 ppm.

| RM | CONTROL 1 | EXAMPLE 3 | EXAMPLE 4 | EXAMPLE 5 | EXAMPLE 6 |
|---|---|---|---|---|---|
| Sodium Hydroxide, Beads | 69.88 | 61.000 | 62.000 | 62.000 | 62.000 |
| NaOH 50 Percent Liquid | 10 | 11.000 | 13.678 | 11.680 | 11.680 |
| Water | 20.12 | 9.250 | 3.722 | 6.000 | 6.520 |
| Formulation 1, 44% | 0 | 18.750 | 0.000 | 0.000 | 0.000 |
| Formulation 2, 40% | 0 | 0.000 | 20.6 | 0.000 | 0.000 |
| Formulation 3, 40.6% | 0 | 0.000 | 0 | 20.33 | 0.000 |
| Formulation 4, 41.6% | 0 | 0.000 | 0 | 0 | 19.800 |
| Formulation 5, 39.5% | 0 | 0.000 | 0 | 0 | 0.000 |
| Formulation 6, 36% | 0 | 0.000 | 0 | 0 | 0.000 |
| Formulation 7, 36% | 0 | 0.000 | 0 | 0 | 0.000 |
| Formulation 8, 36% | 0 | 0.000 | 0 | 0 | 0.000 |
| Total | 100 | 100.000 | 100.000 | 100.010 | 100.000 |

| RM | EXAMPLE 7 | EXAMPLE 8 | EXAMPLE 9 | EXAMPLE 10 |
|---|---|---|---|---|
| Sodium Hydroxide, Beads | 62.000 | 62.000 | 62.000 | 62.000 |
| NaOH 50 Percent Liquid | 11.700 | 11.700 | 11.700 | 11.700 |
| Water | 5.400 | 3.35 | 3.35 | 3.35 |
| Formulation 1, 44% | 0.000 | 0.000 | 0.000 | 0.000 |
| Formulation 2, 40% | 0.000 | 0.000 | 0.000 | 0.000 |
| Formulation 3, 40.6% | 0.000 | 0.000 | 0.000 | 0.000 |
| Formulation 4, 41.6% | 0.000 | 0.000 | 0.000 | 0.000 |
| Formulation 5, 39.5% | 20.900 | 0.000 | 0.000 | 0.000 |
| Formulation 6, 36% | 0.000 | 22.950 | 0.000 | 0.000 |
| Formulation 7, 36% | 0.000 | 0.000 | 22.950 | 0.000 |
| Formulation 8, 36% | 0.000 | 0.000 | 0.000 | 22.950 |
| Total | 100.000 | 100.000 | 100.000 | 100.000 |

Control 1—negative control ran at 666 ppm detergent

Control 2—Solid Power XL available from Ecolab, Inc.—Ran at a concentration of 750 ppm Examples 3-10—ran at 750 ppm detergent Formulation 1: 44 wt % aqueous solution of terpolymer (A.1) of 75:20:5 wt-% of polymerized monomers a1:a2:a3 (molecular weight $M_w$ 5500 g/mol (determined by GPC); K-value 19.5, determined in 1 wt % aqueous solution).

Formulation 2: 40 wt % aqueous solution of terpolymer (A.2) of 75:20:5 wt-% of polymerized monomers a1:a2:a3 (molecular weight $M_w$ 6500 g/mol (determined by GPC); K-value 23.2, determined in 1 wt % aqueous solution).

Formulation 3: 40.6 wt % aqueous solution of terpolymer (A.3) of 40:30:30 wt-% of polymerized monomers a1:a2:a3 (K-value 20.8, determined in 1 wt % aqueous solution).

Formulation 4: 41.6 wt % aqueous solution of terpolymer (A.4) of 60:10:30 wt-% of polymerized monomers a1:a2:a3 (K-value 20.7, determined in 1 wt % aqueous solution).

Formulation 5: 39.5 wt % aqueous solution of terpolymer (A.5) of 60:30:10 wt-% of polymerized monomers a1:a2:a3 (K-value 21.3, determined in 1 wt % aqueous solution).

Formulation 6: 36 wt % aqueous solution of terpolymer (A.6) of 70:20:10 wt-% of polymerized monomers a1:a2:a3 (molecular weight approx. 6000 g/mol (determined by GPC)).

Formulation 7: 36 wt % aqueous solution of terpolymer (A.7) of 75:20:5 wt-% of polymerized monomers a1:a2:a3 (molecular weight approx. 8000 g/mol (determined by GPC)).

Formulation 8: 36 wt % aqueous solution of terpolymer (A.8) of 70:20:10 wt-% of polymerized monomers a1:a2:a3 (molecular weight approx. 5500 g/mol (determined by GPC)) The molecular weights of various terpolymers (A) were measured by GPC in buffered aqueous solutions (pH value: 7) and/or provided as defined in the K-value of the respective terpolymer (A).

Composition of terpolymers (A.1) to (A.8):

| terpolymer | monomer a1 | monomer a2 | monomer a3 |
|---|---|---|---|
| (A.1) | acrylic acid | AMPS | $H_2C=CH-CH_2-O[EO]_{17}-H$ |
| (A.2) | acrylic acid | AMPS | $H_2C=CH-CH_2-O[EO]_{17}-H$ |
| (A.3) | acrylic acid | AMPS | $H_2C=CH-CH_2-O[EO]_{17}-H$ |
| (A.4) | acrylic acid | AMPS | $H_2C=CH-CH_2-O[EO]_{17}-H$ |
| (A.5) | acrylic acid | AMPS | $H_2C=CH-CH_2-O[EO]_{17}-H$ |
| (A.6) | acrylic acid | AMPS | $H_2C=C(CH_3)-CH_2-CH_2O[EO]_{20}-H$ |
| (A.7) | acrylic acid | AMPS | $H_2C=C(CH_3)-CH_2-CH_2O[EO]_{20}-H$ |
| (A.8) | acrylic acid | AMPS | $H_2C=C(CH_3)-CH_2-CH_2O[EO]_{10}-H$ |

Abbreviations: 2-acrylamido-2-methylpropanesulfonic acid (AMPS), EO: $CH_2CH_2O$ The respective terpolymers (A.1) to (A.8) were used in partially neutralized form, pH value 4.5.

Film Accumulation Test

Each 100 cycle experiment was performed using a Hobart AM-IS industrial warewash machine. Examples 3-10 were tested at a concentration of 750 ppm and a water hardness of 17 grain. Control 1 was tested at 666 ppm detergent. Control 2 was tested at 750 ppm detergent.

100 Cycle Test Procedure 100 cycle warewash testing was performed using six 10 oz. Libbey glasses on a Hobart AM-14 or AM-15 warewash machine and 17 grain water (1 grain=17 ppm). The specifications of the Hobart AM-15 warewash machine are as follows:

Washbath volume: 58 L (AM15), 60 L (AM14)
Rinse volume: 2.8 L (AM15), 4.5 L (AM14)
Wash time: 50 sec.
Rinse time: 9 sec.
Cleaning Libbey Glasses
Purpose:

To prepare 10 oz. Libbey glasses for laboratory warewashing procedures. This cleaning procedure is designed to remove all film and foreign material from the glass surface.

Apparatus and Materials:
1. Aluminum foil.
2. 3 gallon stainless steel pails.
3. Large hotplates.
4. Distilled water.
5. Warewash machine hooked up to hot soft water.
6. Libbey 10 oz. tumblers.
7. Paper towels or Soft Cotes.
8. Large flat rack.
9. Lime-A-Way—20 gms.
10. Guardian Plus—20 gms.
11. Polyphosphate RM 111104 or 111203—10 gms.
12. Insulated gloves.
13. Clean towel.

Preparation:
1. Fill the pail with distilled water and place on hot plate set on high. Cover with aluminum foil and bring to a boil. This takes about 1 to 1½ hours
2. Fill glass rack with dirty glasses and load in dishmachine
3. Fill dishmachine with hot soft water (130° F. minimum).
4. Add Lime-A-Way. Close door to start automatic cycle.
5. When cycle is complete, drain and refill the machine with fresh hot water.
6. Run automatic cycle. Drain and refill the machine.
7. Add Guardian Plus and run on automatic cycle.
8. Drain and refill the machine.
10. Run automatic cycle. Drain and refill the machine.
11. Add polyphosphate and run on automatic cycle.
12. Drain and refill the machine.
13. Run automatic cycle. Drain the machine. Put on the insulated gloves.
14. Fill machine with boiling distilled water.
15. Open the control panel on the top of the machine. Flip the toggle switch to delime.
16. Close the machine door and let run with distilled water for 3 minutes.
17. Remove the glasses and mop the tops with a clean dry towel.
18. Allow glasses to dry in rack. If the rack is elevated on one side, it facilitates draining and drying.
19. Store clean glasses in stainless steel cabinets in the warewashing lab.
20. Drain water from machine. Return toggle switch to normal.

100 cycle Warewash Test Procedure:
Purpose:

To provide a generic method for evaluating glass and plastic film accumulation in an institutional warewash machine. This procedure is used to evaluate test formulations, Ecolab products, and competitive products.

Principle:

Test glasses are washed in an institutional warewash machine with a predetermined concentration of detergent. All of the glasses are left untreated and examined for film accumulation.

Clean 6 glasses according to above procedure. Fill the dishmachine with the appropriate water. Test the water for hardness. Record the value. Turn on tank heaters. Turn on the dishmachine and run wash/rinse cycles through the machine until a wash temperature of 150-160° F. and rinse temperature of 175-190° F. is reached. Set controller to dispense appropriate amount of detergent into the wash tank. Titrate to verify detergent concentration.

The 100 cycle experiments were performed by placing 6 clean glasses in a Raburn rack (see figure below for arrangement) and placing the rack inside the dishmachine.

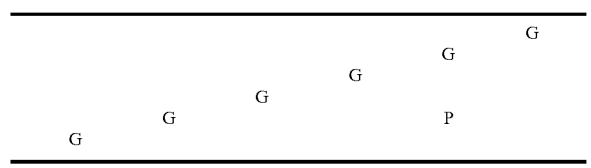

At the beginning of each wash cycle, the appropriate amount of detergent composition to achieve the desired concentration was automatically dispensed into the warewash machine to maintain the initial detergent concentration. The glasses were dried overnight, and then the following visual numeric grades were assigned for film accumulation using a strong light source.

Film accumulation on the glasses was analyzed using a lightbox test. The lightbox test standardizes the evaluation of the glasses run in the 100 cycle test using an analytical method. The lightbox test is based on the use of an optical system including a photographic camera, a lightbox, a light source and a light meter. The system is controlled by a computer program (Spot Advance and Image Pro Plus).

After the 100 cycle test, each glass was placed on its side in the lightbox, and the intensity of the light source was adjusted to a predetermined value using a light meter. The conditions of the 100 cycle test were entered into the computer. A picture of the glass was taken with the camera and saved on the computer for analysis by the program. The picture was analyzed using the upper half of the glass in order to avoid the gradient of darkness on the film from the top of the glass to the bottom of the glass, based on the shape of the glass.

Generally, a lower lightbox rating indicates that more light was able to pass through the glass. Thus, the lower the lightbox rating, the more effective the composition was at preventing scaling on the surface of the glass. Light box evaluation of a clean, unused glass has a light box score of approximately 12,000 which corresponds to a score of 72,000 for the sum of six glasses.

The Tables below show the results of the light box tests. A light box score differing by 10,000 is considered significant.

| Hobart AM14 | LIGHT BOX SCORES | | |
|---|---|---|---|
| | Glasses | Plastic | SUM |
| CONTROL 1 | 393210 | 64452 | 457662 |
| CONTROL 2 | 173689 | 32031 | 205720 |
| EXAMPLE 3 | 146639 | 23541 | 170180 |
| EXAMPLE 4 | 108250 | 23002 | 131252 |
| EXAMPLE 5 | 304950 | 27185 | 332135 |

| Hobart AM14 | LIGHT BOX SCORES | | |
|---|---|---|---|
| | Glasses | Plastic | SUM |
| EXAMPLE 6 | 204363 | 21138 | 225501 |
| EXAMPLE 7 | 234002 | 33431 | 267433 |
| EXAMPLE 8 | 237262 | 28834 | 266096 |
| EXAMPLE 9 | 247768 | 36543 | 284311 |
| EXAMPLE 10 | 173682 | 45643 | 219325 |

| Hobart AM15 | LIGHT BOX SCORES | | |
|---|---|---|---|
| | Glasses | Plastic | SUM |
| CONTROL 1 | 393210 | 65535 | 458745 |
| CONTROL 2 | 147284 | 30191 | 177475 |
| EXAMPLE 3 | 135590 | 24313 | 159903 |
| EXAMPLE 4 | 160914 | 25662 | 186576 |
| EXAMPLE 5 | 251360 | 26881 | 278241 |
| EXAMPLE 6 | 135220 | 16181 | 151401 |
| EXAMPLE 7 | 103594 | 16068 | 119662 |
| EXAMPLE 8 | 156819 | 27656 | 184475 |
| EXAMPLE 9 | 268303 | 22321 | 290624 |
| EXAMPLE 10 | 150267 | 26543 | 176810 |

The results indicate that Examples 3-10 containing a combination of the respective terpolymers (A.1) to (A.8) and a source of alkalinity had significantly improved or at least substantially similar light box scores in comparison to than the control 1 and 2. As shown in the Tables above wherein the Examples provided total light measurements (Sum of glass and plastic measurements) either less than the control 1 and/or 2 or performed within the acceptable range of control 1 and/or 2, the example formulations demonstrate at least substantially similar cleaning.

What is claimed is:

1. A detergent composition for hard water scale control comprising:
    at least 55 wt-% of alkali metal hydroxide; and
    at least one carboxylic acid terpolymer comprising in copolymerized form from 45 to 90% by weight of at least one monoethylenically unsaturated $C_3$-$C_8$-carboxylic acid, or an anhydride or salt thereof, from about 3 to 60% by weight of at least one monomer comprising a sulfo group, and from about 3 to 40% by weight of at least one nonionic monomer of the formula I $$H_2C = C(R^1)(CH_2)_xO[R^2 - O]_y - R^3 \qquad (I)$$

in which $R^1$ is hydrogen or methyl, $R^2$ are identical or different, linear or branched $C_2$-$C_6$-alkylene wherein $R^2$—O may be arranged in blocks or randomly, and $R^3$ is hydrogen or a straight-chain or branched $C_1$-$C_4$-alkyl, x is 0, 1 or 2 and y is a number from 3 to 50; and wherein the detergent composition is free of phosphate.

2. The detergent composition of claim 1 further comprising an additional polymer selected from the group consisting of: polyacrylic acid, polymethacrylic acid, polymaleic acid homopolymers, copolymers of acrylic acid, methacrylic acid or maleic acid, terpolymers of acrylic acid, methacrylic acid, and maleic acid, and combinations thereof.

3. The detergent composition of claim 1 comprising from 55 wt-% to about 90 wt-% of the alkali metal hydroxide, and from about 11 wt-% to about 25 wt-% of carboxylic acid terpolymers; wherein the composition drug use, has a pH between about 9.5 and 14.

4. The detergent composition of claim 1, wherein y in formula (I) is >5, x in formula (I) is 1, and $R^1$ in formula (I) is H.

5. The composition of claim 1, wherein o in formula (I) is >5, x in formula (I) is 2, and $R^1$ in formula (I) is methyl.

6. The detergent composition of claim 1, Wherein the carboxylic acid terpolymer comprises from 45 to 90% by weight of the monoethylenically unsaturated $C_3$-$C_8$ carboxylic acid monomer, anhydride or salt thereof, from about 4 to 40% by weight of the monomer comprising a sulfo group, and from about 4 to 20% by weight of the nonionic monomer of the formula (I).

7. The detergent composition of claim 1, wherein the $R^2$ is selected from $CH_2CH_2$ and $CH_2CH(CH_3)$, and y is in the range of from 8 to 40, wherein the monomer comprising a sulfo group is allylsulfonic acid or 2-acrylamido-2-methyl-propanesulfonic acid, and/or wherein the carboxylic acid monomer, anhydride or salt thereof is selected from the group consisting of acrylic acid, methacrylic acid and salts thereof.

8. The detergent composition of claim 1, further comprising at least one functional ingredient selected from the group consisting of: chelating agents, sequestering agents, alkaline sources, water conditioners, surfactants, hardening agents, bleaching agents, sanitizers, activators, detergent builders, fillers, defoaming agents, anti-redeposition agents, optical brighteners, dyes, odorants, stabilizing agents, dispersants, enzymes, corrosion inhibitors, thickeners and solubility modifiers.

9. The detergent composition of claim 8, wherein the detergent composition is a solid.

10. The detergent composition of claim 9, wherein the solid detergent composition is a cast, pressed, or extruded solid.

11. A method of using an alkaline detergent with hard water to provide scale control, comprising:
    generating a use solution of an the detergent composition according to claim 1
    applying said use solution to an article or surface; and
    preventing hard water scaling on said article or surface.

12. The method of claim 11, wherein the use solution is applied to said article or surface at a temperature between about 145-180 degrees Fahrenheit.

* * * * *